United States Patent
Kato et al.

(10) Patent No.: US 7,844,054 B2
(45) Date of Patent: *Nov. 30, 2010

(54) STREAM RECORDING AND/OR REPRODUCING APPARATUS AND METHOD

(75) Inventors: Motoki Kato, Kanagawa (JP); Masanobu Nakamura, Tokyo (JP)

(73) Assignee: Sony Corporation (JP)

( * ) Notice: Subject to any disclaimer, the term of this patent is extended or adjusted under 35 U.S.C. 154(b) by 878 days.

This patent is subject to a terminal disclaimer.

(21) Appl. No.: 10/399,105

(22) PCT Filed: Aug. 13, 2002

(86) PCT No.: PCT/JP02/08263

§ 371 (c)(1), (2), (4) Date: Apr. 15, 2003

(87) PCT Pub. No.: WO03/017658

PCT Pub. Date: Feb. 27, 2003

(65) Prior Publication Data

US 2004/0213053 A1   Oct. 28, 2004

(30) Foreign Application Priority Data

Aug. 20, 2001   (JP) .............................. 2001-249680

(51) Int. Cl.
*H04N 7/167* (2006.01)
(52) U.S. Cl. ...................... 380/201; 380/205; 380/210
(58) Field of Classification Search .......... 713/500–503, 713/600–601; 726/26–33, 22; 380/30, 200, 380/201, 205, 210, 214, 221
See application file for complete search history.

(56) References Cited

U.S. PATENT DOCUMENTS

| | | | | |
|---|---|---|---|---|
| 5,664,018 A * | 9/1997 | Leighton | .................... | 380/54 |
| 5,960,081 A * | 9/1999 | Vynne et al. | ................ | 713/176 |
| 6,108,423 A * | 8/2000 | Sako et al. | .................. | 380/203 |
| 6,145,081 A * | 11/2000 | Winograd et al. | ............. | 726/33 |
| 6,330,672 B1 * | 12/2001 | Shur | ......................... | 713/176 |
| 6,453,420 B1 * | 9/2002 | Collart | ........................ | 726/26 |
| 6,490,355 B1 * | 12/2002 | Epstein | ..................... | 380/203 |
| 6,523,113 B1 * | 2/2003 | Wehrenberg | ................ | 713/176 |
| 6,526,510 B1 * | 2/2003 | Kori et al. | ................... | 713/176 |
| 6,553,127 B1 * | 4/2003 | Kurowski | ................... | 382/100 |

(Continued)

FOREIGN PATENT DOCUMENTS

JP   9-98381 A1   4/1997

(Continued)

*Primary Examiner*—David Garcia Cervetti
(74) *Attorney, Agent, or Firm*—Lerner, David, Littenberg, Krumholz & Mentlik, LLP

(57) ABSTRACT

An information recording and/or reproducing method for supervising the information, such as an input source, in a stream recorded on a recording medium. If, in a reproduction processing of reproducing an AV stream from the recording medium, the source_security_info, which is the copy control information recorded on the recording medium, is read out, the AV stream is read out, and analog video, for example, is output (step 203), it is verified, from the information contained in the source_security_info, whether or not the input source is DTCP-concordant. If the input source is DTCP-concordant, reproduction restricting processing for a video output, conforming to the DTCP rule, is executed to issue the video output.

17 Claims, 18 Drawing Sheets

U.S. PATENT DOCUMENTS

| | | | |
|---|---|---|---|
| 6,611,599 B2* | 8/2003 | Natarajan | 380/203 |
| 6,748,485 B1* | 6/2004 | Yokota et al. | 711/112 |
| 6,810,388 B1* | 10/2004 | Sato | 705/57 |
| 6,850,619 B1* | 2/2005 | Hirai | 380/203 |
| 7,000,113 B1* | 2/2006 | Linnartz | 713/176 |
| 7,260,219 B2* | 8/2007 | Linnartz et al. | 380/202 |
| 7,310,823 B2* | 12/2007 | Okamoto et al. | 726/31 |
| 7,502,034 B2* | 3/2009 | Chemel et al. | 345/594 |
| 2003/0051255 A1* | 3/2003 | Bulman et al. | 725/135 |
| 2004/0096110 A1* | 5/2004 | Yogeshwar et al. | 382/239 |
| 2005/0123284 A1* | 6/2005 | Kikuchi et al. | 386/125 |

FOREIGN PATENT DOCUMENTS

| | | |
|---|---|---|
| JP | 2001-94552 A1 | 4/2001 |
| JP | 2001-229614 A1 | 8/2001 |

\* cited by examiner

| SYNTAX | No. of bits | Mnemonic |
|---|---|---|
| source_packet() { | | |
|     TP_extra_header() | | |
|     transport_packet() | | |
| } | | |

FIG.4

| SYNTAX | No.of bits | Mnemonic |
|---|---|---|
| TP_extra_header() { | | |
|     copy_permission_indicator | 2 | uimsbf |
|     arrival_time_stamp | 30 | uimsbf |
| } | | |

FIG.5

| copy_permission_indicator | meaning |
|---|---|
| 00 | copy free |
| 01 | no more copy |
| 10 | copy once |
| 11 | copy prohibited |

FIG.6

| SYNTAX | No. of bits | Mnemonic |
|---|---|---|
| zzzzz.clpi { | | |
|     version_number | 8*4 | bslbf |
|     SequenceInfo_start_address | 32 | uimsbf |
|     ProgramInfo_start_address | 32 | uimsbf |
|     CPI_start_address | 32 | uimsbf |
|     ClipMark_start_address | 32 | uimsbf |
|     MakersPrivateData_start_address | 32 | uimsbf |
|     reserved_for_future_use | 96 | bslbf |
|     ClipInfo () | | |
|     for (i=0; i<N1 ; i++){ | | |
|         padding_word | 16 | bslbf |
|     } | | |
|     SequenceInfo () | | |
|     for (i=0; i<N2 ; i++){ | | |
|         padding_word | 16 | bslbf |
|     } | | |
|     ProgramInfo () | | |
|     for (i=0; i<N3 ; i++){ | | |
|         padding_word | 16 | bslbf |
|     } | | |
|     CPI () | | |
|     for (i=0; i<N4 ; i++){ | | |
|         padding_word | 16 | bslbf |
|     } | | |
|     ClipMark () | | |
|     for (i=0; i<N5 ; i++){ | | |
|         padding_word | 16 | bslbf |
|     } | | |
|     MakersPrivateData () | | |
|     for (i=0; i<N6 ; i++){ | | |
|         padding_word | 16 | bslbf |
|     } | | |
| } | | |

FIG.7

| SYNTAX | No. of bits | Mnemonic |
|---|---|---|
| ClipInfo() { | | |
|     length | 32 | uimsbf |
|     reserved_for_future_use | 16 | bslbf |
|     Clip_stream_type | 8 | uimsbf |
|     reserved_for_word_align | 6 | bslbf |
|     transcode_mode_flag | 1 | bslbf |
|     controlled_time_flag | 1 | bslbf |
|     TS_average_rate | 32 | uimsbf |
|     TS_recording_rate | 32 | uimsbf |
|     source_security_info() | | |
|     TS_type_info_block() | | |
|     if (Clip_stream_type=="Bridge-Clip AV stream"){ | | |
|         preceding_Clip_information_file_name | 8*10 | bslbf |
|         SPN_exit_from_preceding_Clip | 32 | uimsbf |
|         following_Clip_information_file_name | 8*10 | bslbf |
|         SPN_enter_to_following_Clip | 32 | uimsbf |
|     } | | |
| } | | |

FIG.8

| SYNTAX | No. of bits | Mnemonic |
|---|---|---|
| source_security_info() { | | |
| reserved | 6 | bslbf |
| is_cognizant | 1 | uimsbf |
| is_WM_checked | 1 | uimsbf |
| reserved | 4 | bslbf |
| source_type | 4 | uimsbf |
| Integrity_Check_Value | 64 | uimsbf |
| } | | |

FIG.9

| source_type | meaning |
|---|---|
| 0 | TRANSPORT STREAM INPUT USING A DTCP-CONCORDANT METHOD OVER IEEE 1394 |
| 1 | TRANSPORT STREAM INPUT WITHOUT USING A DTCP-CONCORDANT METHOD OVER IEEE1394 |
| 2 | INPUT OF A TUNER ENCLOSED IN DIGITAL TV BROADCAST |
| 3 | INPUT OF A TUNER ENCLOSED IN ANALOG TV BROADCAST |
| 4 | VIDEO LINE INPUT |
| 5 - 15 | reserved |

FIG.10

| source_type | meaning |
|---|---|
| 0 | TRANSPORT STREAM INPUT USING A DTCP-CONCORDANT METHOD OVER IEEE1394 |
| 1 | OTHER THAN ABOVE |

FIG.11

| SYNTAX | No. of bits | Mnemonic |
|---|---|---|
| source_security_info() { | | |
|     reserved | 7 | |
|     is_cognizant | 1 | uimsbf |
|     is_WM_checked | 1 | uimsbf |
|     status_WM | 2 | uimsbf |
|     WM_transition_flag | 1 | uimsbf |
|     source_type | 4 | uimsbf |
|     Integrity_Check_Value | 64 | uimsbf |
| } | | |

FIG.12

| status_WM | meaning |
|---|---|
| 00 | copy free |
| 01 | no more copy |
| 10 | copy once |
| 11 | copy prohibited |

FIG.13

| WM_transition_flag | |
|---|---|
| 1 | INDICATES THAT, IN AN ADDRESS IN AN AV STREAM, THE STATUS_WM OF WHICH HAS BEEN ENCODED, THE MEANING OF WM IN THE AV STREAM WAS CHANGED (AS COMPARED TO THAT AHEAD OF THE ADDRESS) |
| 0 | INDICATES THAT, IN AN ADDRESS IN AN AV STREAM, THE STATUS_WM OF WHICH HAS BEEN ENCODED, THE MEANING OF WM IN THE AV STREAM IS THE SAME (AS THAT AHEAD OF THE ADDRESS) |

FIG.14

| INPUT SIGNAL STATE | | STATE OF RECORDED AV STREAM | | | |
|---|---|---|---|---|---|
| CGMS | WM | CCI_o | WM_o | E_CCI | status_WM. copy_permission_indicator(c_p_I) |
| 00 | 00 | 00 | 00 | 00 | 00 |
| 01 | 101 | NOT RECORDABLE | | | |
| 10 | 10 | 01 | 101 | 01 | 01 |
| 11 | 11 | NOT RECORDABLE | | | |

00 : copy free 01, 101 : no more copy

10 : copy once

11 : copy prohibited

FIG.16

| INPUT SIGNAL STATE | STATE OF RECORDED AV STREAM | | | |
|---|---|---|---|---|
| WM | | WM_o | E_CCI | status_WM. copy_permission_indicator(c_p_I) |
| 00 | | 00 | 00 | 00 |
| 101 | RECORDING IS TO BE DISCONTINUED | | | |
| 10 | | 101 | 01 | 01 |
| 11 | RECORDING IS TO BE DISCONTINUED | | | |

FIG.17

| INPUT SIGNAL STATE | | STATE OF RECORDED AV STREAM | | | |
|---|---|---|---|---|---|
| E_CCI | WM | CCI_o | WM_o | E_CCI | status_WM. copy_permission_indicator(c_p_I) |
| 00 | 00 | 00 | 00 | 00 | 00 |
| 01 | 101 | NOT RECORDABLE | | | |
| 10 | 10 | 01 | 101 | 01 | 01 |
| 11 | 11 | NOT RECORDABLE | | | |

FIG.18

| INPUT SIGNAL STATE | | | STATE OF RECORDED AV STREAM | | | |
|---|---|---|---|---|---|---|
| EMI | E_CCI | WM | CCI_o | WM_o | E_CCI | status_WM. copy_permission_indicator(c_p_I) |
| 00 | 00 | 00 | 00 | 00 | 00 | 00 |
| 01 | 01 | 101 | NOT RECORDABLE | | | |
| 10 | 10 | 10 | 01 | 101 | 01 | 01 |
| 11 | 11 | 11 | NOT RECORDABLE | | | |

FIG.19

| INPUT SIGNAL STATE | STATE OF RECORDED AV STREAM | |
|---|---|---|
| EMI | CCI_o | copy_permission_indicator(c_p_I) |
| 00 | 00 | 00 |
| 01 | NOT RECORDABLE | |
| 10 | 01 | 01 |
| 11 | NOT RECORDABLE | |

FIG.20

| INPUT SIGNAL STATE | | STATE OF RECORDED AV STREAM | | | |
|---|---|---|---|---|---|
| E_CCI | WM | CCI_o | WM_o | E_CCI | status_WM. copy_permission_indicator(c_p_I) |
| 00 | 00 | 00 | 00 | 00 | 00 |
| 01 | 101 | NOT RECORDABLE | | | |
| 10 | 10 | 01 | 101 | 01 | 01 |
| 11 | 11 | NOT RECORDABLE | | | |

FIG.21

| INPUT SIGNAL STATE | STATE OF RECORDED AV STREAM |
|---|---|
| | copy_permission_indicator(c_p_I) |
| Don't care | 00 |

FIG.22

CONTINUED FROM

| RECORDING SIGNAL STATE E_CCI | REPRODUCIBLE ? |
|---|---|
| 00 | REPRODUCTION OK ; REPRODUCTION TO BE DISCONTINUED |
| 01 | REPRODUCTION OK ; CCI IS TO BE UPDATED TO 01 |
| 10 | REPRODUCTION TO BE DISCONTINUED |
| 11 | |

00 : copy free
01 : no more copy
10 : copy once
11 : copy prohibited

FIG.25

| RECORDING SIGNAL STATE WM | CHECK WM OF REPLAY SIGNAL WM o |
|---|---|
| 00 | REPLAY AS 00 IS KEPT |
| 101 | REPRODUCTION TO BE DISCONTINUED |
| 10 | UPDATE TO 101 AND REPRODUCE |
| 11 | REPRODUCTION TO BE DISCONTINUED |

00 : copy free
101 : no more copy
10 : copy once
11 : copy prohibited

FIG.26

CONTINUED FROM

STREAM RECORDING AND/OR REPRODUCING APPARATUS AND METHOD

CROSS-REFERENCE TO RELATED APPLICATIONS

The present application is a national stage application under 35 U.S.C. §371 of International Application No. PCT/JP02/08263, filed Aug. 13, 2002, which claims priority from Japanese Application No. 2001-249680, filed Aug. 20, 2001, the disclosures of which are hereby incorporated by reference herein.

BACKGROUND OF THE INVENTION

1. Technical Field

This invention relates to an information recording apparatus for recording a stream, an information reproducing apparatus, an information recording method and an information reproducing method. More particularly, it relates to an information recording apparatus, an information reproducing apparatus, an information recording method and an information reproducing method for appropriately supervising the information pertinent to a stream.

2. Background Art

Recently, proposal has been made for a variety of optical discs, such as DVR, as a disc-shaped information recording medium, amongst recording mediums that may be mounted to and dismounted from a recording and/or reproducing apparatus,. The optical disc as this recording medium has been proposed as a large-capacity medium having a capacity as large as several gigabyte. This optical disc is thought to be promising as a recording medium for recording AV (audio visual) signals, such as video signals.

Among the encoding systems for performing digital compression of AV signals, there is an MPEG2 (Moving Picture Experts Group 2) system. This MPEG2 is the format of compression of moving pictures of the international standard, aimed to achieve a high picture quality, with the aid of compression techniques such as prediction of motion compensation, DCT (discrete cosine transform), quantization and variable length coding. The MPEG2 is also applied for recording AV signals on a recording medium. For example, in recording analog video signals on a recording medium, video signals are encoded in accordance with the MPEG2 system, and an encoded bitstream is recorded on the medium. In TV broadcast of the digital system of recent origin, the AV stream, encoded with the MPEG2 system, is transmitted with a format called a transport stream (TS). In recording digital broadcast on a recording medium, such a system is used in which the transport stream is recorded in the state of digital signals, without decoding or encoding.

If the AV signals are recorded in a digital signal format, the AV signals may be copied on a different recording medium without deterioration. This poses a serious problem for the copyright owner of the AV signals. Thus, for restricting the copying of the AV signals, such a method is used in which the copy control information (CCI), as the copying restricting information, namely [copy free], [copy once], [no more copy] and [copy prohibited] is provided to the AV signals.

There is, for example, a CGMS (copy generation management system) signal for video signals. This CGMS is a system for controlling the number of times of possible copying on the part of the software. The CGMS for an analog interface is called CGMS-A, while that for a digital interface is called CGMS-D. The CGMS-A for analog is also called VBID because the ID is superimposed on the VBI (vertical blanking interval). This is standardized as EIAJ-CP-1204. If a reproducing apparatus is to analog-video-output non-copy-free AV signals, recorded on a recording medium, it is required that the CGMS shall be inserted in the video signals.

There is such a method in which a descriptor having the copy control information is encoded as the copy control information in recording a transport stream such as digital TV broadcast. Examples of this sort of the descriptor include DTCP (Digital Transmission Content Protection) provided for by DTLA (Digital Transmission Licensing Administrator) and a digital_copy_control_descriptor provided for by ARIB (Association of Radio Industries and Business) and used in BS digital broadcast of Japan. If the non-copy-free transport stream, recorded on a recording medium, is output by a reproducing apparatus in the state of the transport stream, it is required that this sort of the descriptor shall be encoded in the transport stream.

In recording the transport stream of for example the digital TV broadcast, there are two methods, namely a method in which a digital TV tuner enclosed in the recording apparatus is used as an input source, and a method in which an external set top box, called STB, is used as an input source. In the latter case, the STB and the recording apparatus are interconnected over an IEEE1394 digital bus. It is necessary in this case that the copy control information of the transport stream shall be guarded securely on the digital bus, in order to prevent the situation in which the copy control information is hacked on the digital bus such that its value is rewritten.

With this in mind, the aforementioned DTLA provides for a system in which the transport stream is transmitted using an IEEE1394 digital bus. This system is widely known as the so-called 5C system (DTCP-concordant system). In the DTCP system, the 2-bit information, called the Encryption Mode Indicator (EMI), is transmitted in a header of an isochronous packet, used in isochronous transfer of IEEE1394, this representing the encryption mode of the payload of the isochronous packet.

This EMI has, in association with the payload copy control information, the meaning of [00(=copy free)], [10(=copy once)], [01(no more copy)] and [11(=copy prohibited)]. In recording by the DTCP system, such a method is allowed in which the recording restriction is achieved using only EMI as the copy control information without analyzing the copy control information encoded in the transport stream (called Embedded CCI). This recording method is called the non-cognizant recording mode. On the other hand, the method which effects recording as the embedded CCI is analyzed is called the cognizant recording mode. The AV signals recorded on the recording medium in accordance with the DTCP system are required to be reproduced in accordance with the system conforming to the DTCP system.

Such a system is also studied in which the copy control information called the watermark is embedded in the base-band AV signals or in a MPEG bitstream. As for the watermark, activities for standardization are now going on and proposal has been made for a millennium system and a galaxy system. When the watermark has been formally introduced into the market, it is required that, when the MPEG bitstream or the AV signals, recorded on the recording medium, are reproduced by a reproducing apparatus, the watermark shall be embedded in the MPEG bitstream or the AV signals.

Turning to a recording apparatus for recording the MPEG bitstream on a recording medium, it may be premeditated that the input sources for recording will be variegated in time to come. For example, (1) an MPEG stream obtained by the recording apparatus self-encoding the line input of analog video;

(2) an MPEG stream obtained by the recording apparatus self-encoding the video from a tuner input of the analog TV broadcast enclosed in the recording apparatus;
(3) a transport stream from a tuner input of digital TV broadcast enclosed in the recording apparatus;
(4) a transport stream input with the DTCP-concordant method over IEEE1394; and
(5) a transport stream input not with the DTCP-concordant method over IEEE1394 may be thought of as possible input sources.

For recording a transport stream of for example digital TV broadcast, there are two methods, namely a method in which the transport stream from the digital TV tuner enclosed in the recording apparatus is used as an input source, and a method in which the transport stream input from an external set top box (STB) via IEEE1394 is used as an input source. With the former method, the DTCP system need not be used, whereas, with the latter method, recording must be made using the DTCP-concordant method at least as long a the BS broadcast of Japan is concerned. Thus, in reproducing the stream recorded using the former method, there is no necessity of applying reproduction restrictions concordant with the DTCP system, whereas, in reproducing the stream recorded with the latter method, reproduction restrictions concordant with the DTCP system need to be applied.

Up to now, no information indicating [what is the input source of the transport stream recorded on the recording medium?] was recorded, so that appropriate reproduction restrictions could not be applied in reproducing the transport stream.

It is currently attempted to introduce the watermark into the DVD video, with a view to preventing the analog video output of the DVD video player from being recorded illicitly. On the other hand, the watermark is likely not to be introduced into the analog TV broadcast which basically may be recorded freely. In such situation, an input source of an MPEG stream, recorded on self-encoding the analog video line input, may possibly be a DVD video output, so that, when the MPEG stream is reproduced, it is required to check the watermark to apply reproduction restrictions. On the other hand, with the MPEG stream, recorded on self-encoding the analog TV broadcast, it may be premeditated that the watermark need not be checked at the time of reproducing the MPEG stream.

Heretofore, [what is the input source of the MPEG stream recorded on the recording medium?] was not recorded, such that appropriate reproduction restrictions could not be applied in reproducing the corresponding MPEG stream.

On the other hand, in recording the transport stream in accordance with the DTCP-concordant system, either the cognizant recording mode or the non-cognizant recording mode may be used. When the transport stream, recorded by the cognizant recording mode, is decoded to reproduce the analog video, it is unnecessary to check the watermark or the Embedded CCI of the transport stream. However, when the transport stream, recorded by the non-cognizant recording mode, is decoded to reproduce the analog video, it is necessary to check the watermark or the Embedded CCI of the transport stream.

Heretofore, the information indicating [Which is the recording mode of the transport stream recorded on the recording medium, the cognizant recording mode or the non-cognizant recording mode?] was not recorded, so that, when the transport stream is reproduced, it was not possible to verify whether or not the check of the Embedded CCI or the watermark was necessary.

Moreover, if the watermark was checked in recording an AV stream, it is unnecessary to check the watermark in reproducing the AV stream. If conversely the watermark was not checked in recording an AV stream, the watermark needs to be checked in reproducing the AV stream.

Up to now, the information indicating: [Was the watermark checked at the time of recording the AV stream currently recorded on the recording medium?] was not recorded, so that it could not be verified whether or not the watermark needs to be checked at the time of reproducing the transport stream.

SUMMARY OF THE INVENTION

It is therefore an object of the present invention to provide a novel stream recording apparatus, an information reproducing apparatus, a recording and/or reproducing apparatus, a stream recording method and a stream reproducing apparatus, whereby the aforementioned technical difficulties may be overcome.

It is another object of the present invention to provide an information recording apparatus, an information reproducing apparatus, a recording and/or reproducing apparatus, a stream recording method and a stream reproducing apparatus, whereby the information such as the input source in the stream recorded on the recording medium can be supervised appropriately.

It is yet another object of the present invention to provide an information recording apparatus, an information reproducing apparatus, a recording and/or reproducing apparatus, a stream recording method and a stream reproducing apparatus, whereby appropriate reproduction restrictions can be applied in reproducing a stream recorded on the recording medium.

For accomplishing the above objects, the present invention provides a An information recording apparatus including an input unit for inputting a stream from a preset input source, and a recording unit for recording the information pertinent to the sort of a source, usable for applying restrictions on the reproduction of the stream, on a recording medium along with the stream.

Preferably, the recording unit records, at the time of recording the stream, the information indicating whether or not the watermark has been checked, and/or the information indicating whether the recording mode for the stream is the cognizant recording mode or the non-cognizant recording mode.

The recording unit may add a code for preventing falsification or encrypts and records the information. The recording unit may record the status of the watermark in the stream. The recording unit may record the information as the information separate from the stream or records the information as the information is encoded in the stream.

The present invention also provides an information reproduction apparatus for reproducing a stream furnished from a predetermined input source and recorded on a recording medium, including an information readout unit for reading out, from the recording medium, the information pertinent to the sort of the input source, along with the stream, and a controller for exercising control for applying predetermined reproduction restrictions to the stream to reproduce the resulting stream based on the information read out from the information readout unit.

Preferably, the controller verifies, from the information read out by the information readout means, whether or not the stream is derived from the input source concordant with a rule pertinent to a content protecting function and, if the stream is based on the input source concordant with the rule, the controller causes reproduction restriction to be applied in accordance with the rule to reproduce the resulting stream.

The information readout unit reads out the watermark check information indicating whether or not the watermark was checked at the time of recording the stream on the recording medium. The controller reproduces the stream as it checks the watermark based on the read-out watermark check information without checking the watermark. With this configuration, it is possible to reduce the frequency of occurrence of mistaken operations otherwise caused by unneeded watermark check processing.

The present invention also provides a recording and/or reproducing apparatus including an input unit for inputting a stream from an input source concordant with a rule pertinent to a protecting function for digital contents, a recording unit for recording the stream, input by the input unit, with the recording also being made of the information indicating that the stream has been input by a method concordant with the rule, and an output unit for issuing a video output of the stream, recorded by the recording unit, in accordance with reproduction restrictions conforming to the rule.

The information recorded on the recording medium indicates that the stream has been input by a method concordant with the rule indicating whether or not the stream has been input using a method concordant with the DTCP (Digital Transmission Content Protection).

The present invention also provides stream recording method including grasping the sort of a source as the information used for applying reproduction restrictions of an input stream, and recording the stream on a recording medium as the information pertinent to the sort of the source grasped is recorded on the recording medium.

The present invention also includes a stream reproducing method including acquiring, in reading out a stream from a recording medium, the information pertinent to an input source of the stream, and applying predetermined reproduction restrictions, based on the information pertinent to the sort of the input acquired, to reproduce the stream.

The stream recording method and the stream reproducing method according to the present invention may be implemented as respective processing operations in a recording medium having stored therein a computer-readable program for execution by a computer, or as a program the respective functions of which may be achieved by a computer of an information recording apparatus or by an information reproducing apparatus.

The present invention also encompasses a recording medium, such as a DVR, that may be read in or reproduced by an information recording apparatus, an information reproducing apparatus or an information recording and/or reproducing apparatus. That is, in a recording medium according to the present invention, an information recording area of the recording medium includes, in a Clip having a pair of one stream and the ancillary information for the stream as an object, a clip stream file as a stream file and a clip information file as the ancillary information, while the clip information file includes the information pertinent to the sort of the input source in the stream.

The clip information file further includes the information indicating whether or not the watermark has been checked at the time of recording the stream and/or the information indicating whether the recording mode of the stream is the cognizant recording mode or the non-cognizant recording mode.

Other objects, features and advantages of the present invention will become more apparent from reading the embodiments of the present invention as shown in the drawings.

BRIEF DESCRIPTION OF THE DRAWINGS

FIG. 4 shows the syntax of a programming sentence structure of a source packet.

FIG. 5 shows the syntax of TP_extra_header ( ).

FIG. 6 shows the relationship between the values of copy_permission_indicator and the modes these values designate.

FIG. 7 shows the syntax of Clip Information File.

FIG. 8 shows the syntax of ClipInfo ( ).

FIG. 9 shows the syntax of source_security info ( ) in ClipInfo ( ).

FIG. 10 shows a meaning of source_type value.

FIG. 11 shows another instance of the meaning of source_type.

FIG. 12 shows another instance of the meaning of source_type.

FIG. 13 shows an instance in the syntax of the source_security_info ( ).

FIG. 14 shows a meaning of WM_transition_flag.

FIG. 16 illustrates copy control processing in case an input source is a video line input.

FIG. 17 illustrates copy control processing in case an input source is a video input from an analog TV tuner enclosed in a recording apparatus.

FIG. 18 illustrates copy control processing in case an input source is a TS from an enclosed tuner of a digital TV broadcast.

FIG. 19 illustrates copy control processing in case the input source is a TS input using a system conforming to DTCP through IEEE1394, with the TS being recorded by cognizant recording.

FIG. 20 illustrates copy control processing in case the input source is a TS input using a system conforming to DTCP through IEEE1394, with the TS being recorded by non-cognizant recording.

FIG. 21 illustrates copy control processing in case the input source is a TS input without using a system conforming to DTCP through IEEE1394, with the TS being recorded by cognizant recording.

FIG. 22 illustrates copy control processing in case the input source is a TS input without using a system conforming to DTCP through IEEE1394, with the TS being recorded by non-cognizant recording.

FIG. 25 shows processing of reproduction restriction based on inspection of E_CCI during reproduction by the reproducing apparatus according to the present invention.

FIG. 26 illustrates the processing carried out by the WM inspection unit.

DETAILED DESCRIPTION

Figure 1:
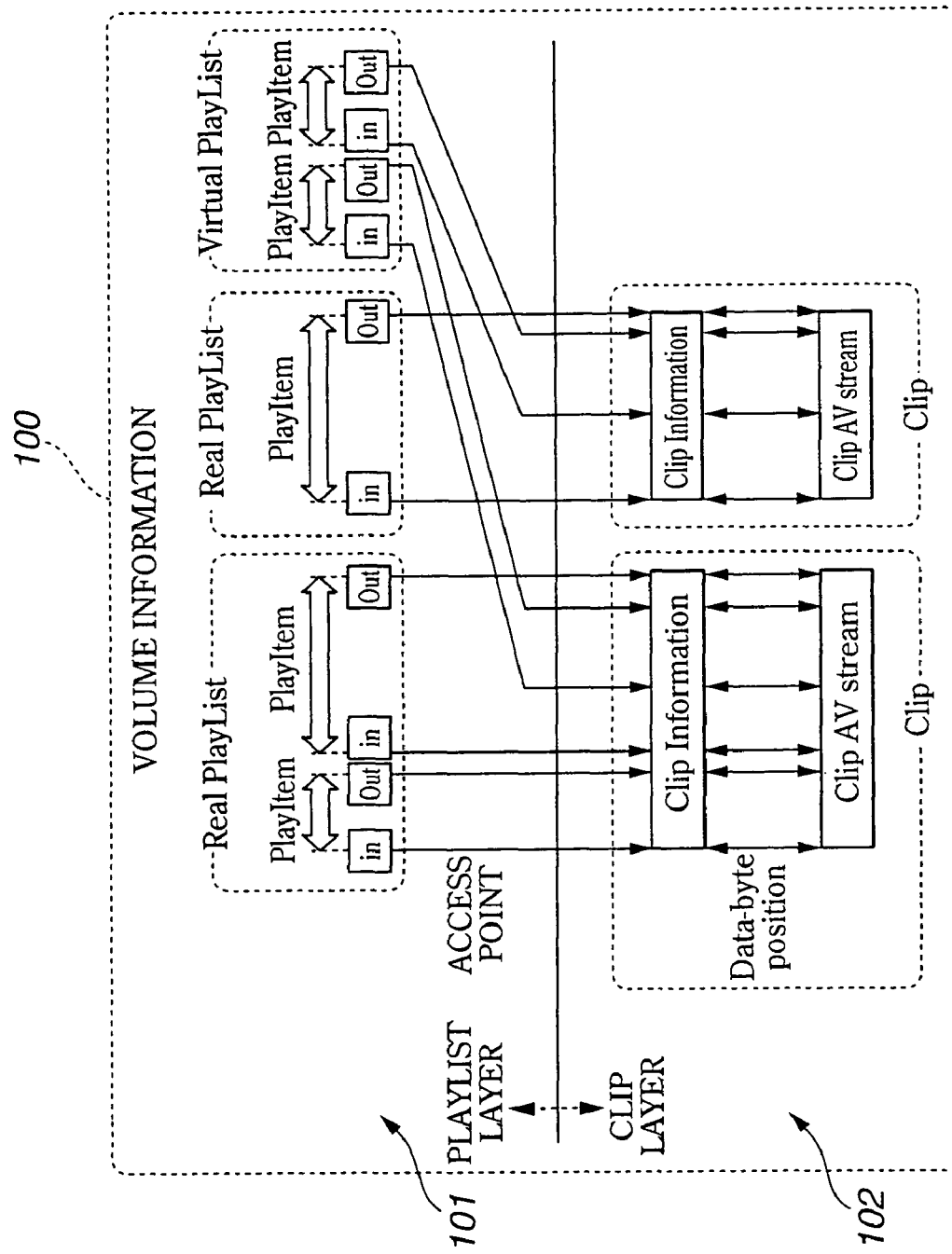
FIG. 1 shows the structure of an application format on a recording medium used in for example an information recording apparatus or an information reproducing apparatus embodying the present invention.

Best Mode for Carrying out the Invention

Referring to the drawings, certain preferred embodiments of the present invention are explained in detail.

Before proceeding to explanation of the system configuration embodying the present invention, the data format, applied to the present invention, is explained to aid in the understanding of the system configuration of the present invention.

FIG. 1 shows the structure of an application format on a recording medium used in an information recording apparatus or the information reproducing apparatus embodying the present invention. For supervising an AV stream, this format includes two layers, namely a PlayList layer 101, close to the user interface (user I/F), and a Clip layer 102, close to the system. A Volume Information 100 supervises all clips and PlayLists in the disc.

It is noted that a pair of one AV stream and the ancillary information therefor is thought of as an object, and is termed a Clip. The AV stream file is termed a Clip AV stream file, its ancillary information being termed a Clip Information file. One Clip AV stream file has stored therein data corresponding to an MPEG2 transport stream arrayed in a structure prescribed by the DVR application format.

In general, a data file, used in e.g., a computer, is handled as a byte string. On the other hand, the contents of the Clip AV stream file are expanded on the time axis, with the PlayList having the access point in the Clip specified mainly by the time stamp. When the time stamp of the access point in the Clip is afforded by the PlayList, the Clip Information file is useful in finding the address information with which to start the decoding of the stream in the Clip AV stream file.

The PlayList is introduced for selecting, from the Clip, the playback domain the user is desirous to view, and for editing it readily. One PlayList is a set of replay domains in the Clip. One replay domain in a Clip is termed a PlayItem, and is represented by a pair of IN point (In Time) and an OUT point (Out Time) on the time axis. That is, the PlayList may be said to be a set of PlayItems.

The PlayList is of two types, of which one is Real PlayList and the other is Virtual PlayList. This Real PlayList may be thought of as co-owning stream portions of the Clip it is referencing. That is, Real PlayList takes up in the disc the data volume corresponding to the stream portion in the Clip it is referencing. When the AV stream is recorded as a new Clip, a Real PlayList, referencing the reproducible range of the entire Clip, is created automatically. When a portion of the reproducible range of the Real PlayList is erased, the stream portion of the Clip it is referencing also has its data erased. The Virtual PlayList is deemed to be not co-owning Clip data. The Clip is not changed whatsoever if the Virtual PlayList is changed or erased.

In the following explanation, Real PlayList and Virtual PlayList are generically termed Playlist.

Among the directories, required on the DVR disc, there is, first and foremost, a root directory, including a "DVR" directory. There are also a "PLAYLIST" directory, a "CLIPINF" directory, a "STREAM" directory, and a "DVR" directory including a "DATA" directory. Although other directories than these may be created below the root directory, they are discounted in the present DVR application format.

Figure 2:
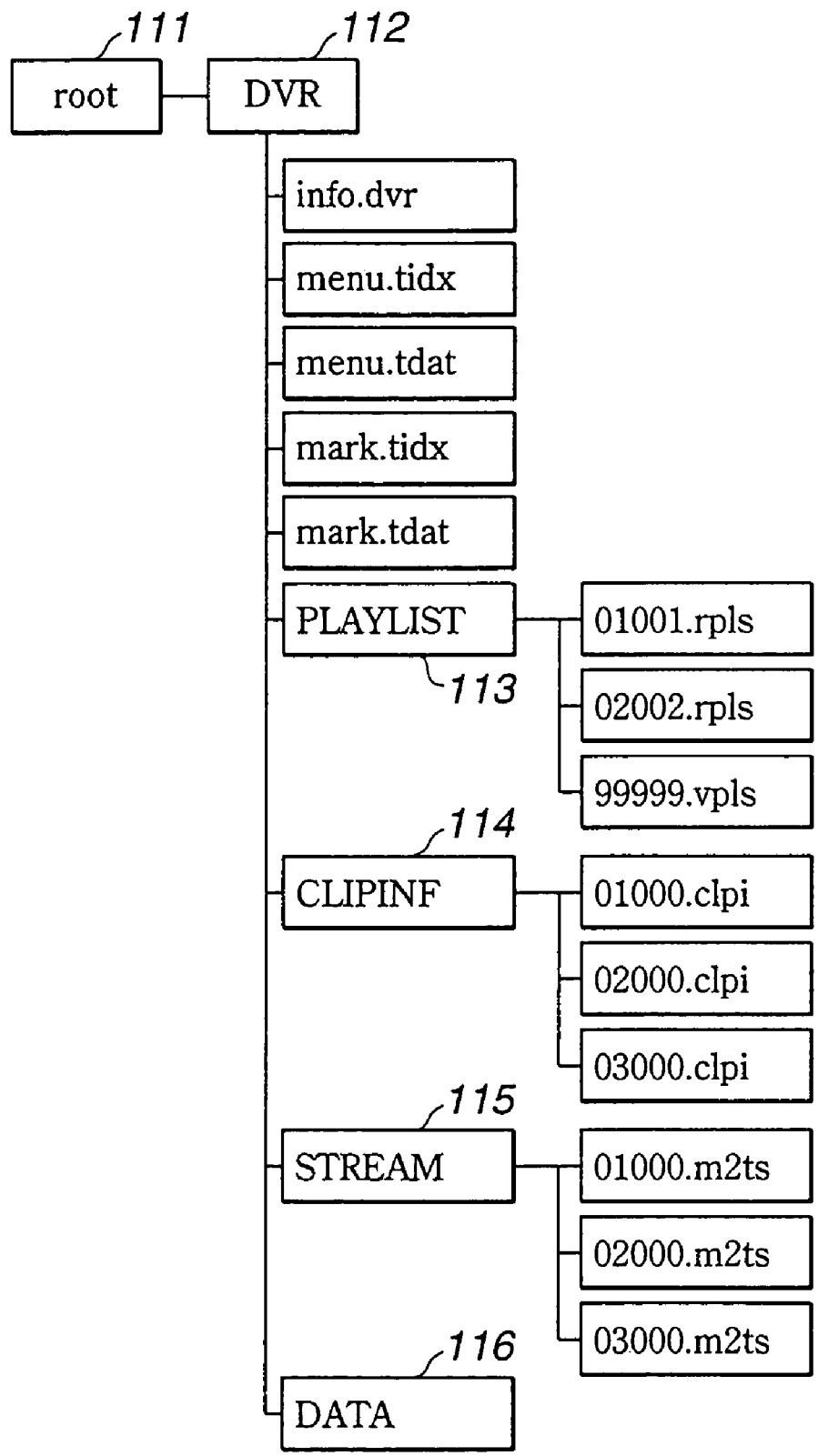
FIG. 2 shows an instance of a directory structure created on a DVD disc.

FIG. 2 shows an instance of a directory structure created on a DVR disc.

A root directory 111 includes one directory ("DVR" directory 112). The files and directories, prescribed by the "DVR": DVR application format, must unexceptionally be stored under this directory.

The "DVR" directory 112 includes four directories, namely a "PLAYLIST" directory 113, a "CLIPINF" directory 114, a "STREAM" directory 115 and a "DATA" directory 116. The database files of the "PLAYLIST": Real PlayList and Virtual PlayList must be placed under this directory. This directory must be present even if there is no PlayList. The database of the "CLIPINFO": Clip must be placed under this directory. This directory must be present even if there is no Clip. The "STREAM": AV stream file must be paced under this directory. This directory must be present even if there is no AV stream file.

The "PLAYLIST" directory 113 is used for storing two sorts of PLAYLIST files. These are the aforementioned Real PlayList and Virtual PlayList. "xxxxx.rpls": this file stores the information pertinent to one Real PlayList. One file is created for each Real PlayList. The filename is "xxxxx.rpls", where xxxxx denotes five numbers of from 0 to 9. The file extension must be "rpls". "yyyyy.vpls": this file stores the information pertinent to one Virtual PlayList. One file is created for each Virtual PlayList. The filename is "yyyyy.vpls", where "yyyyy" denotes five numbers of from 0 to 9. The file extension must be "vpls".

The "CLIPINFO" directory 114 stores one file in association with each AV stream file. "zzzzz.cpli": This file is a Clip Information file corresponding to one AV stream file (Clip AV stream file or Bridge-Clip AV stream file). The filename is "zzzzz.clpi", where "zzzzz" denotes five numbers of from 0 to 9. The file extension must be "clpi".

The "STREAM" directory 115 stores an AV stream file. "zzzzz.m2ts": this file is an AV stream file handled by the DVR system. This is a Clip AV stream file or a Bridge-Clip AV stream file. The filename is "zzzzz.m2ts", where "zzzzz" denotes five numbers of from 0 to 9. The file extension must be "m2ts". One AV stream file and the corresponding Clip information File must use the same five numbers "zzzzz".

Meanwhile, the other directories and file names are not explained.

Figure 3:
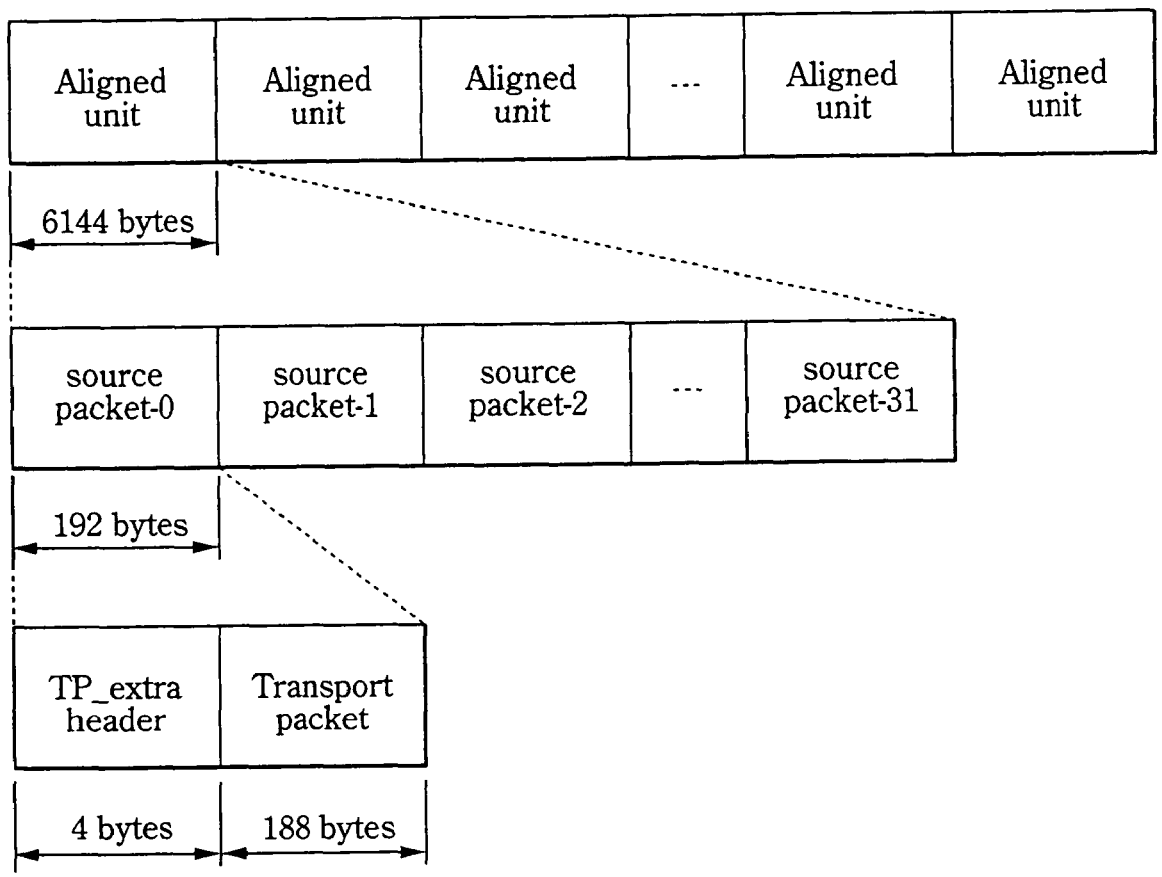
FIG. 3 shows the structure of an AV stream file.

FIG. 3 shows the structure of an AV stream file. The AV stream file must have a structure of the DVR MPEG2 transport stream shown in FIG. 3. As may be seen from FIG. 3, the DVR MPEG2 transport stream is featured by the following points:

1) that the DVR MPEG2 transport stream is made up by an integer number of Aligned units;
2) the size of the Aligned unit is 6144 bytes (2048×3 bytes);
3) the Aligned unit begins with the first byte of the source packet;
4) the source packet is 192 bytes long; one source packet is made up by TP_extra_header and a transport packet; the TP_extra_header is 4 bytes long and the transport packet is 188 bytes long; and that
5) one Aligned unit is made up by 32 source packets.

Additionally, the DVR MPEG2 transport stream is featured by the following points:

6) that the last Aligned unit in the DVR MPEG2 transport stream is also made up by 32 source packets; and that
7) if the last Aligned unit has not been filled completely with transport packets of the input transport stream, the residual byte area must be filled with source packets having null packets (transport packets of PID=0x1FFF).

FIG. 4 shows a syntax which is a programming sentence structure of a source packet. TP_extra_header ( ) is a header four bytes long. The transport_packet ( ) is a 188 byte MPEG2 transport packet prescribed by ISO/IEC13818-1.

FIG. 5 shows the syntax of TP_extra_header ( ). The copy_permission_indicator is an integer representing copy restriction of the payload (Payload) of the transport packet. The copy restriction may be copy free, no more copy, copy once or copy prohibited. The arrival_time_stamp is a time stamp indicating the time when the corresponding transport packet arrives at a decoder.

FIG. 6 shows the relationship between the values of the copy_permission_indicator and the modes these designate. The copy_permission_indicator is an integer representing the copy restriction of the payload (Payload) of the transport packet. The copy restriction may be copy free, no more copy, copy once or copy prohibited. The copy_permission_indicator is added to each transport packet.

When the input transport stream is recorded using the IEEE1394 digital interface, the value of the copy_permission_indicator may be associated with the value of EMI (Encryption Mode Indicator) in the IEEE1394 isochronous packet header. When the input transport stream is recorded without using the IEEE1394 digital interface, the value of the copy_permission_indicator may be associated with the value of the copy control information (CCI) embedded in the transport packet. If the video input is self-encoded, the values of the copy_permission_indicator may be associated with the values of the CGMS of the input signals.

The database format, supervising the replay information of the AV stream file, is hereinafter explained.

FIG. 7 shows the syntax of the Clip Information File. The Clip Information File has ClipInfo ( ), SequenceInfo ( ). ProgramInfo ( ), CPI ( ), ClipMark ( ) and MakersPrivate Data ( ).

FIG. 8 shows the syntax of this ClipInfo ( ). The source_security_info ( ) in the ClipInfo ( ) includes the information supervising the copy restriction information of the clip AV stream, and defines the information for supervising the recording mode and the input source of the AV stream.

FIG. 9 shows the syntax of the source_security_info ( ) in the ClipInfo ( ). If the value of the is_cognizant is 1, it indicates that the recording of the AV stream file is the cognizant recording, whereas, if the value of the is_cognizant is 0, it indicates that the recording of the AV stream file is the non-cognizant recording.

The cognizant recording is a recording mode of analyzing the CCI (termed Embedded CCI; descriptor or watermark having the CCI) encoded in the transport stream in recording the transport stream in e.g., digital broadcast. On the other hand, the non-cognizant recording is a recording mode not analyzing the CCI encoded in the transport stream in recording the transport stream in e.g., digital broadcast.

When recording the input stream input over the IEEE1394 digital interface by non-cognizant recording, recording restrictions on the transport stream are carried out on the basis of the value of the EMI (Encryption mode Indicator) in the IEEE1394 isochronous packet header.

If the value of the is_WM_checked is 1, it indicates that, when the recording apparatus records the AV stream, the recording apparatus has analyzed the watermark of the AV stream and updated the watermark as necessary. If the value of the is_WM_checked is 0, it indicates that the watermark was recorded without analysis at the time of recording the AV stream. Since the watermark standardization is not as yet in order at the current time, that is in July 2001, the value of is_WM_checked may be set to zero for a recording apparatus manufactured prior to the time point when the recording restrictions by the watermark are imposed on the recording apparatus.

The source_type indicates an input source of the recorded AV stream. The meaning of the value of the source_type is shown in FIG. 10. Another instance of the meaning of the source_type is shown in FIG. 11. The methods for setting the value of the source_type in recording and of employing the source_type in reproduction will be explained in detail subsequently.

The Integrity_Check_Value is a code for indicating that the content of the source_security_info ( ) has not been falsified. This code is obtained on calculations with a preset encrypting algorithm on input data from the first byte up to the byte directly previous to the Integrity_Check_Value of the source_security_info ( ). The encrypting algorithm may, for example, be an algorithm stated in ISO/IEC 9797 (Information technology—Security techniques—Data integrity mechanism using a cryptographic check function employing a block cipher algorithm).

If the content of the source_type of the source_security_info ( ) is falsified by a user with malignant intention such that [input conforming to DTCP] is falsified to [input not conforming to DTCP], the recording apparatus is able to inspect the value of the Integrity_Check_Value to detect that the source_security_info ( ) has been falsified. If it has been detected that the source_security_info ( ) has been falsified, the source_security_info ( ) is no longer reliable, so that the recording apparatus disables the replay of the AV stream having this source_security_info ( ).

In order to disable falsification of the content of the source_security_info ( ) from being falsified, it is possible to scramble the source_security_info ( ) or the entire Clip Information File.

In the above-described embodiment, the source_security_info ( ) is stated in the Clip information File. Alternatively, the source_security_info ( ) may be encoded in the AV stream. For example, the source_security_info ( ) may be encoded in the form of a descriptor provided for in the MPEG2 transport stream.

FIG. 12 shows another instance of the syntax of the source_security_info ( ). This embodiment may be applied with advantage to storing the source_security_info ( ) not only in the Clip Information File, but also in the AV stream. In the source_security_info ( ) of FIG. 12, the status_WM and the WM_transition_flag are added to the syntax shown in FIG. 9.

As for the value of the is_WM_checked, if this value is 1, it indicates that the recording apparatus analyzed the watermark of the AV stream, during recording the AV stream, and updated it as necessary. If the value of the is_WM_checked is 0, it indicates that the recording apparatus recorded the watermark, during recording the AV stream, without analyzing the watermark. On the other hand, if the value of the is_WM_checked is 1, it indicates that the values of the next following status_WM and WM_transition_flag are effective, whereas, if the value of the is_WM_checked is 0, it indicates that the values of the next following status_WM and WM_transition_flag are ineffective.

FIG. 13 shows an instance of the meaning of the status WM. In this case, the status WM indicates a representative value, for example, the strongest value, of the copy restriction information of the AV stream represented by the watermark embedded in the AV stream.

FIG. 14 shows the meaning of the WM_transition_flag. If, in this case, the value of the WM_transition_flag is 1, it indicates that the meaning of WM of the AV stream has been changed in an address in which the status_WM has been encoded in the AV stream as compared to that ahead of the address. If the value of the WM_transition_flag is 0, the meaning of WM of the AV stream is the same in an address in which the status_WM has been encoded in the AV stream as that ahead of the address.

By recording this status_WM during recording, there is no longer the necessity of analyzing the AV stream when it is desired at the time of reproducing the AV stream to comprehend the status of the watermark thereof. Thus, if it is desired to copy an AV stream on a recording medium to a different recording medium, whether or not copying is possible can be determined by referring to the status_WM without analyzing the watermark embedded in the AV stream. On the other hand, the WM_transition_flag can be used for speeding up the retrieving processing for the WM change point in the AV stream.

The Integrity_Check_Value is a code for indicating that the content of the source_security_info ( ) has not been falsified. This code is obtained on calculations with a preset encrypting algorithm on input data from the first byte up to the byte directly previous to the Integrity_Check_Value of the source_security_info ( ). The encrypting algorithm may, for example, be an algorithm stated in ISO/IEC 9797.

In order to disable falsification of the content of the source_security_info ( ), it is possible to scramble the source_security_info ( ) or the entire Clip Information File.

The system configuration of the recording apparatus embodying the present invention is hereinafter explained.

Figure 15:
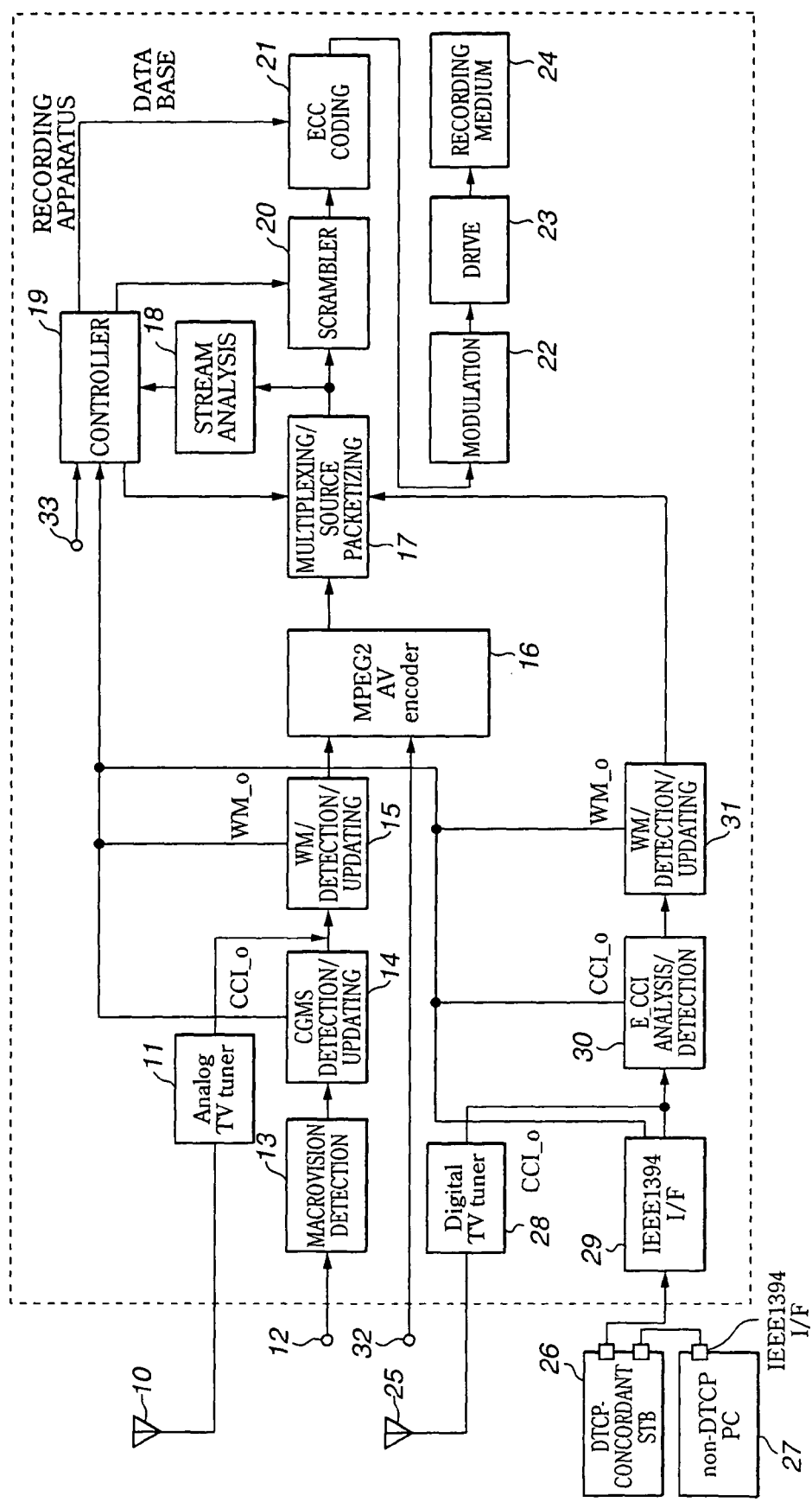
FIG. 15 is a block diagram showing a structure of a recording apparatus embodying the present invention.

FIG. 15 is a block diagram showing the structure of a recording apparatus embodying the present invention. In this case, in recording an AV stream, the source_security_info ( ) for the AV stream is formulated and recorded. In the present embodiment, a command signal of an input source of AV signals, recorded from a terminal 33, is supplied to a controller 29. Among input sources, there are a video line input, an input of a tuner for analog TV broadcast, enclosed in the recording apparatus, an input of a tuner for digital TV broadcast, enclosed in the recording apparatus, a transport stream, input by a method conforming to the DTCP through IEEE1394, and a transport stream, input through IEEE1394 without using a method conforming to the DTCP. The controller 19 encodes the command signals of these input sources in the source_security_info ( ).

The recording apparatus, shown in FIG. 15, is provided with input terminals 10, 12, 32 and 25 for the above-mentioned input sources. The recording apparatus also includes a TV tuner 11, for taking out video signals from an RF input of the terminal 10, a macrovision detector 13 for analyzing macrovision signals of the input video for imposing restrictions on the recording of the input signals, a CGMS detection/updating unit 14 for analyzing the CGMS of the input video, a WM (watermark) detection/updating unit 15 for analyzing the watermark of the input video, an MPEG2AV encoder 16 for encoding input video/audio signals, and a multiplexing/source packetizing unit 17 for supplying an AV stream comprised of plural source packets.

The recording apparatus also includes a stream analyzer 18 for analyzing the information of an input source packet string, and the aforementioned controller 19 in which an input source command signal from a terminal 33 is encoded into the source_security_info ( ) and in which the value of the E_CCI (Embedded CCI) encoded in the AV stream is determined on the basis of the input CCI_o and WM_o. The recording apparatus additionally includes a scrambler 20 for scrambling an input source packet string, an ECC (error correction) encoder 21, a modulator 22, a driver 23 and a recording medium 24, such as DVR.

FIG. 15 also shows a ste top box (STB) 26 for performing the processing for IEEE1394 connection in conformity to DTCP, and a PC 27 for supplying a transport stream not conforming to DTCP. There are also provided a digital TV tuner 28 as an enclosed tuner, an IEEE1394 interface (I/F) 29 for performing the processing for IEEE1394 connection, an E_CCI analysis/updating unit 30 for analyzing the CCI (E_CCI: Embedded CCI) encoded in the input transport stream, and a WM detection/updating unit 31 for analyzing the watermark of the input video.

Referring first to FIG. 15, the case of recording an AV stream, obtained on self-encoding the video and audio inputs from the external line input terminals (terminals 12, 32), is explained.

In the macrovision detector 13, macrovision signals of the input video, entered in the terminal 12, are analyzed by a preset method to impose recording restrictions on the input signals. The input video, thus restricted as to recording, are sent to the CGMS detection/updating unit 14. In this CGMS detection/updating unit 14, the CGMS (CGMS-A or CGMS-D) of the input video is analyzed by a preset method, and the CCI (indicated by CCI_o in the drawing) of the recorded AV stream is sent to the controller 19. The input video is supplied from the CGMS detection/updating unit 14 to the WM (watermark) detection/updating unit 15.

The WM (watermark) detection/updating unit 15 analyzes the watermark (WM) of the input video by a preset method, so that the WM (indicated by WM_o in the drawing) of the AV stream to be recorded is sent to the controller 19. The input video is also supplied from the WM detection/updating unit 15 to the MPEG2AV encoder 16. The MPEG2AV encoder 16 encodes the input video/audio signals into an MPEG video stream and an MPEG audio stream. These MPEG streams are sent to the multiplexing/source packetizing unit 17, to which is supplied the information from the MPEG streams and the controller 19.

In this manner, the controller 19 detects changes in the input WM_o to formulae the source_security_info ( ). In encoding the information of the source_security_info ( ) in the AV stream, the controller 19 sends the information to the multiplexing/source packetizing unit 17. This multiplexing/source packetizing unit 17 has encoded the information of the source_security_info ( ) in the AV stream, such that, for example, a descriptor having the information is encoded.

Based on the input CCI_o and WM_o, the controller 19 decides on the value of the E_CCI (Embedded CCI) encoded in the AV stream in accordance with a preset method. As this E_CCI, a DTCP_descriptor, for example, is used and encoded in the AV stream.

The multiplexing/source packetizing unit 17 decides on the value of the copy_permission_indicator, encoded in the source packet header, in accordance with a predetermined method. The multiplexing/source packetizing unit 17 sends the source packet string to the scrambler 20 and to the stream analysis unit 18. The scrambler 20 scrambles the input source packet string by a predetermined method and sends the scrambled string to the ECC encoder 21. The stream analysis unit 18 analyzes the information of the input source packet string to route the information for forming the database file to the controller 19.

If the source_security_info ( ) is to be stored in the Clip Information file, the controller 19 formulates data of the Clip Information file, having the source_security_info ( ), to route the resulting data to the ECC encoder 21. The AV stream and data of the Clip Information file, input to the ECC encoder 21, are processed by the ECC encoder 21, a modulator 22 and a driver 23 so as to be then recorded on the recording medium 24 as an AV stream file and a Clip Information file, respectively.

Referring to FIG. 15, the case of recording an AV stream, obtained on self-encoding the video signals of an RF input of the analog TV broadcast, is explained.

In the TV tuner 11, video signals are taken out from the RF input and routed to the WM detection/updating unit 15. In the WM detection/updating unit 15, the watermark of the input video is analyzed by a predetermined method such that the watermark in the AV stream to be recorded (indicated by WM_o in the drawing) is supplied to the controller 19. The input video is routed from the WM detection/updating unit 15 to the MPEG2AV encoder 16. The ensuing processing is similar to the processing performed downstream of the MPEG2AV encoder 16 for the case of recording the AV obtained on self-encoding the video and audio inputs from the external line input terminal.

The case of recording the transport stream supplied to the terminal 25 as an RF input of the digital TV broadcast is now explained. The TV tuner 28 takes out the transport stream from the RF input to route the transport stream so taken out to the E_CCI (Embedded CCI) analysis/updating unit 30.

The E_CCI analysis/updating unit 30 analyzes the CCI encoded in the input transport stream (Embedded CCI) by a predetermined method, such that the CCI of the AV stream for recording (indicated by CCI_o in the drawing) is supplied to the controller 19. From the E_CCI analysis/updating unit 30, the input transport stream is routed to the WM detection/updating unit 31. In the WM detection/updating unit 31, the watermark of the AV stream for recording (WM) is analyzed by a predetermined method, such that the WM of the AV stream for recording (indicated by WM_o in the drawing) is routed to the controller 19. The input transport stream is also routed from the WM detection/updating unit 31 to the multiplexing/source packetizing unit 17.

To the multiplexing/source packetizing unit 17 are input the input transport stream and a predetermined command signal from the controller 19. That is, the controller 19 detects changes in the input WM_o to formulate the source_security_info ( ). In encoding the source_security_info ( ) in the AV stream, the controller 19 sends the source_security_info ( ) to the multiplexing/source packetizing unit 17. When encoding the information of the source_security_info ( ) in the AV stream, the multiplexing/source packetizing unit 17 encodes for example the descriptor having the information.

In the multiplexing/source packetizing unit 17, the input transport stream is formed into source packets, which then are supplied to the scrambler 20. The ensuing processing is similar to the processing performed downstream of the scrambler 20 for the case of recording the AV stream corresponding to the self-encoded video and audio inputs from the aforementioned external line input terminal.

The case in which the transport stream, supplied from the STB 26, connected with the IEEE1394, by the system conforming to the DTCP, is recorded with the cognizant recording mode, is hereinafter explained.

In the recording apparatus and the STB 26, shown in FIG. 15, the processing for IEEE1394 connection, conforming to the DTCP, is carried out. In the IEEE1394 interface 29, the EMI (Encryption Mode Indicator) in the header of the input aisochronous packet is analyzed by a predetermined method, and the CCI of the AV stream for recording (indicated by CCI_o in the drawing) is sent to the controller 19. The IEEE1394 interface 29 also sends the input transport stream to the E_CCI analysis/updating unit 30. The ensuing processing is similar to the processing performed downstream of the E_CCI analysis/updating unit 30 for the case of recording the transport stream from the RF input of the aforementioned digital TV broadcast.

The case in which the transport stream supplied from the STB 26, connected with IEEE1394, without using the system conforming to DTCP, is recorded with the non-cognizant recording mode, is hereinafter explained.

In the recording apparatus and the STB 26, shown in FIG. 15, the processing for IEEE1394 connection, conforming to the DTCP, is carried out. In the IEEE1394 interface 29, the EMI (Encryption Mode Indicator) in the header of the input aisochronous packet is analyzed by a predetermined method, and the CCI of the AV stream for recording (indicated by CCI_o in the drawing) is sent to the controller 19. The transport stream, output from the IEEE1394 interface 29, is passed through the E_CCI analysis/updating unit 30 and the WM detection/updating unit 31 without being thereby processed and is supplied to the multiplexing/source packetizing unit 17. The ensuing processing is similar to the processing performed downstream of the multiplexing/source packetizing unit 17 for the case of recording the transport stream from the RF input of the aforementioned digital TV broadcast.

The case in which the transport stream supplied from the PC 27, connected with IEEE1394, without using the system conforming to DTCP, is recorded with the cognizant recording mode, is hereinafter explained.

In the recording apparatus and the PC 27, shown in FIG. 15, the processing of IEEE1394 connection not conforming to DTCP is carried out. In this case, the EMI field of the input isochronous packet has no meaning. From the IEEE1394 interface 29, the input transport stream is supplied to the E_CCI analysis/updating unit 30. The ensuing processing is similar to the processing performed downstream of the E_CCI analysis/updating unit 30 for the case of recording the transport stream from the RF input of the aforementioned digital TV broadcast.

Referring to FIGS. 16 to 22, the copying controlling processing, which differs with the sort of the input source, in the recording apparatus shown in FIG. 15, is hereinafter explained.

FIG. 16 illustrates the copying controlling processing in case the input source is the video line input (in case of the video line input from terminal 12). In FIG. 18, CGMS and WM of the [input signal state] denote the states of CGMS and WM owned by the input signal.

It is noted that
if CGMS of the input video signal is '00', the CGMS detection/updating unit 14 sets CCI_o=00;
if CGMS of the input video signal is '10', the CGMS detection/updating unit 14 sets CCI_o=01 to update the CGMS of the input video; and
if CGMS of the input video signal is '01' or '11', the input video cannot be recorded.

In case of analyzing the WM of the input video signal,
if the WM of the input signal is '00', the WM detection/updating unit 15 sets WM_o=00;
if the WM of the input signal is '10', the WM detection/updating unit 15 sets WM_o=101, while updating the WM of the input video; and
if the WM of the input signal is '101' or '11', the input video cannot be recorded.

The controller 19 sets the value of the same meaning as the CCI_o encoded in the AV stream for recording, while setting a value of the same meaning as the CCI_o in the copy_permission_indicator (c_p_i) of the source packet header. The controller 19 also sets the content of the source_security_info ( ) as follows:

The is cognizant is set to 1;
if the WM of the input video signal is to be analyzed, the is_WM_checked is set to 1, and the value of the same meaning as WM_o is set in the status_WM; the value of the WM_transition_flag is determined by comparison with the previous WM state; and
if the WM of the input video signal is not analyzed, the is_WM_checked is set to 0.

FIG. 17 illustrates the copying controlling processing in case of video input from an analog TV tuner (TV tuner 11) in which an input source is enclosed in the recording apparatus. The WM of the [input signal state] in FIG. 17 denotes the state of WM owned by the input signal.

It is noted that
if the WM of the input video signal is not analyzed, it is deemed that WM_o=00.
If the WM of the input video signal is analyzed, and
when the WM of the input signal is '00', the WM detection/updating unit 15 sets WM_o=00;
when the WM of the input signal is '10', the WM detection/updating unit 15 sets WM_o=101, while updating the WM of the input video; or
when the WM of the input signal is '101' or '11', the input video cannot be recorded.

It should be noted that the controller 19 sets a value of the same meaning as that of the WM_o in the E_CCI encoded in the AV stream for recording, while setting a value of the same meaning as that of the WM_o in the copy_permission_indicator (c_p_i) of the source packet header. The controller 19 also sets the content of the source_security_info ( ) as follows:

is_cognizant is set to 1;
if the WM of the input video signal is to be analyzed, the is_WM_checked is set to 1, and a value of the same meaning as WM_o is set is set in the status_WM; the value of the WM_transition_flag is determined by comparison with the previous WM state.
If the WM of the input video signal is not analyzed, the is_WM_checked is set to 0.

FIG. 18 illustrates the copying controlling processing in case an input source is a TS (transport stream) from an enclosed tuner of a digital TV broadcast (digital TV tuner 28). The E_CCI and WM of the [input signal state] in FIG. 18 denotes the states of E_CCI and WM owned by the input signal, respectively.

It is noted that
if the E_CCI of the input TS is '00', the E_CCI analysis/updating unit 30 sets CCI_o=00.
If the E_CCI of the input TS is '10', the E_CCI analysis/updating unit 30 sets WM_o=01, while updating the E_CCI of the input TS to '01'; and
when the E_CCI of the input TS is '01' or '11', the input video cannot be recorded.
When analyzing the WM of the input TS,
if the WM of the input TS is '00', the WM detection/updating unit 31 sets WM_o=00;
if the WM of the input TS is '10', the WM detection/updating unit 31 sets WM_o=101, while updating the WM of the input TS to '101'; and
if the WM of the input TS is '101' or '11', the input TS cannot be recorded.

The controller 19 sets a value of the same meaning as CCI_o in the copy_permission_indicator(cp_p_I) of the source packet header. The controller 19 also sets the content of the source_security_info ( ) as follows:

the is_cognizant is set to 1;
if the WM of the input video signal is to be analyzed, the is_WM_checked is set to 1, and a value of the same meaning as WM_o is set in the status_WM; the value of the WM_transition_flag is determined by comparison with the previous WM state; and
if the WM of the input video signal is not analyzed, the is_WM_checked is set to 0.

FIG. 19 illustrates the copying controlling processing in case an input source is a TS input through IEEE1394 in accordance with the system conforming to DTCP, this TS being recorded by cognizant recording. The EMI, E_CCI, and WM in the [input signal status] in FIG. 19 stand for the statuses of the EMI, E_CCI and WM, owned by the input signal, respectively.

It is noted that
if the E_CCI of the input TS is '00', the E_CCI analysis/updating unit 30 sets CCI_o=00;
if the E_CCI of the input TS is '10', the E_CCI analysis/updating unit 30 sets CCI_o=01, while updating the E_CCI of the input TS to '01'; and
if the E_CCI of the input TS is '01' or '11', the input TS cannot be recorded.
On the other hand, in analyzing the WM of the input TS,
if the WM of the input TS is '00', the WM detection/updating unit 31 sets WM_o=00;
the WM of the input TS is '10', the WM detection/updating unit 31 sets WM_o=101, while updating the WM of the input TS to '101'; and
if the WM of the input TS is '101' or '11', the input TS cannot be recorded.

It is noted that the controller 19 sets a value of the same meaning as the CCI_o in the copy_permission_indicator (c_p_i) of the source packet header. Additionally, the controller 19 sets the content of the source_security_info ( ) as follows:

the is_cognizant is set to 1;
in analyzing the WM of the input video signal, the is_WM_checked is set to 1, and a value of the same meaning as WM_o is set in the status_WM. The value of the WM_transition_flag is determined by comparison with the previous WM state; and
if the WM of the input video signal is not analyzed, the is_WM_checked is set to 0.

FIG. 20 illustrates the copying controlling processing in case an input source is a TS input through IEEE1394 in accordance with the system conforming to DTCP, this TS being recorded by cognizant recording. The EMI in the [input signal status] in FIG. 19 stands for the statuses of the EMI owned by the input signal.

It is noted that
if the EMI of the input TS is '00', the IEEE1394 interface 29 sets CCI_o=00;
if the EMI of the input TS is '10', the IEEE1394 interface 29 sets CCI_o=01; and
if the EMI of the input TS is '01' or '11', the input TS cannot be recorded.

It is noted that the controller 19 sets a value of the same meaning as the CCI_o in the copy_permission_indicator (c_p_i) of the source packet header. The controller 19 also sets the content of the source_security_info ( ) as follows:

the is_cognizant is set to 0; and
the is_WM_checked is set to 0.

FIG. 21 shows copying controlling processing in case the input source is a TS input through IEEE1394 without employing the system conforming to the DTCP, with the TS being recorded by cognizant recording. The E_CCI and the WM in the [input signal status] in the drawing indicates the state of the E_CCI and WM owned by the input signal, respectively.

It is noted that
if the E_CCI of the input TS is '00', the E_CCI analysis/updating unit 30 sets CCI_o=00;
if the E_CCI of the input TS is '10', the E_CCI analysis/updating unit 30 sets CCI_o=01, while updating the E_CCI of the input TS to '01'; and
if the E_CCI of the input TS is '01' or '11', the input TS cannot be recorded.

Also, in analyzing the WM of the input TS,
if the WM of the input TS is '00', the WM detection/updating unit 31 sets the WM_o=00;
if the WM of the input TS is '10', the WM detection/updating unit 31 sets WM_o=101, while updating the WM of the input TS to '101'; and
if the WM of the input TS is '101' or '11', the input TS cannot be recorded.

It is noted that the controller 19 sets a value of the same meaning as the CCI_o in the copy_permission_indicator (c_p_i) of the source packet header. The controller 19 also sets the content of the source_security_info ( ) as follows:
the is_cognizant is set to 1;
in analyzing the WM of the input video signal, the is_WM_checked is set to 1, and a value of the same meaning as the WM_o is set in the status_WM. The value of the WM_transition_flag is determined by comparison with the previous WM state; and
if the WM of the input video signal is not analyzed, the is_WM_checked is set to 0.

FIG. 22 illustrates the copying controlling processing in case an input source is a TS input through IEEE1394 without using the system conforming to DTCP, this TS being recorded by non-cognizant recording. In this case, there is no reliable CCI, such that the input TS is recorded as being copy-free.

The controller 19 sets 00 in the copy_permission_indicator (c_p_i) of the source packet header. The controller 19 also sets the content of the source_security info ( ) as follows:
the is_cognizant to 0; and
the is_WM_checked is set to 0.

Figure 23:
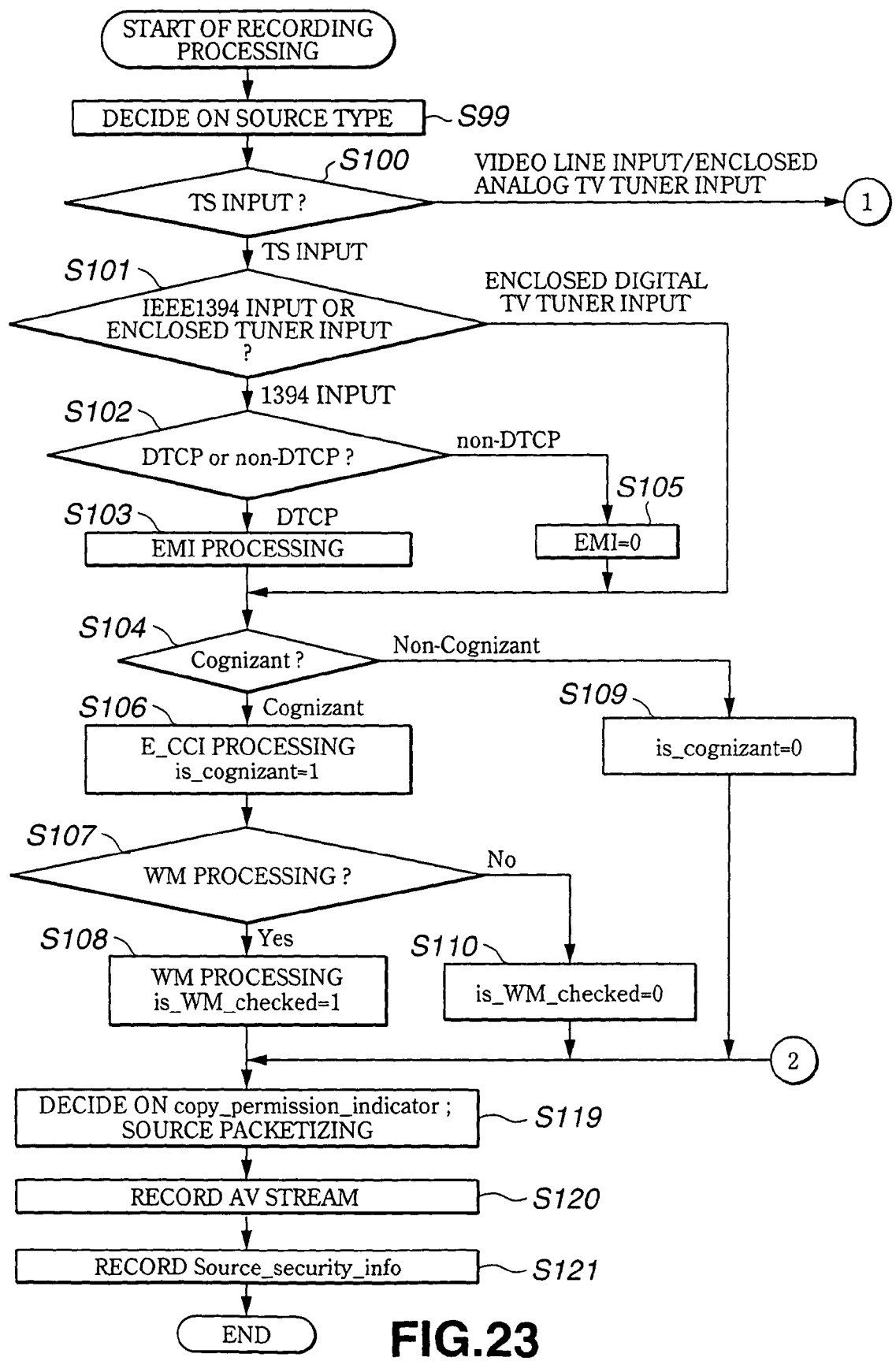
FIG. 23 is a flowchart for illustrating recording processing in the present invention.
Figure 23:
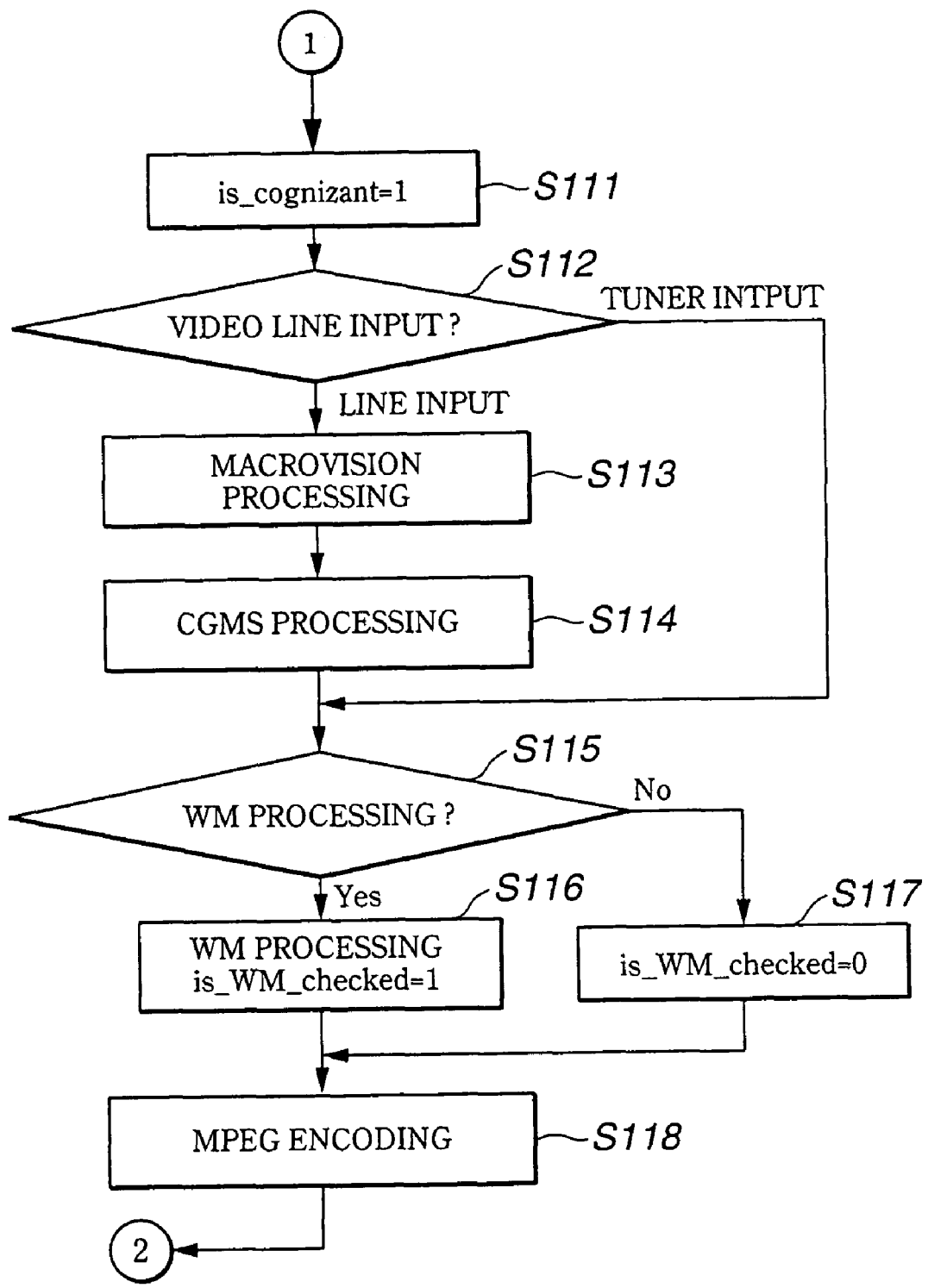

FIG. 23 is a flowchart for illustrating the recording processing in the present embodiment. First, after deciding on the input source type (step S9), it is checked whether or not the input source is a transport stream (TS) input (step 100). If the input source is the transport stream input, processing transfers to a step 101 and, if the input source is the video line input or the input of the enclosed analog TV tuner, processing transfers to a step 111.

First, the case of the input source being the IEEE1393 input or the enclosed digital TV tuner input (step 101), is explained. If the input source is the IEEE1394 input, processing transfers to a step 102 and, if the input source is the input of the enclosed digital TV, processing transfers to a step 104.

If, in the step 101, the input source is the IEEE1394 input, it is checked whether or not the input source conforms to DTCP (step 102). If the input source conforms to DTCP, the value of EMI is read out and the EMI processing is carried out (step 103). If the input source does not conform to DTCP, the value of EMI is deemed to be zero (step 105) and processing transfers to a step 104.

If, in the step 104, the input TS is to be recorded by cognizant recording, processing transfers to a step 106, so that copying controlling processing is carried out by the E_CCI as explained in FIGS. 18, 19 and 21, while the is_cognizant is set to 1. If, in the step S104, the input TS is recorded by the non-recognizant recording, processing transfers to a step 109, so that the is_cognizant is set to 0.

If, in a step 107, the WM of the input TS is to be analyzed, processing transfers to a step 108, so that the copying controlling processing by the WM is carried out as explained with reference to FIGS. 18, 19 and 21, while the is_WM_checked is set to 1. If recording is to be made without analyzing the WM of the input TS, processing transfers to a step 110 to set the is_WM_checked to 0.

After these processing operations, the value of the copy_permission_indicator is determined, as described above. The input transport packet is source-packetized (step 119). The AV stream is recorded (step 120) to record the source_security_info (step 121) to terminate the processing.

A case in which the input source is a video line input or an input of the enclosed analog TV tuner in the step 100 is explained. First, the is_cognizant is set to 1 (step 111) to check whether or not the input source is the video line input (step 112). If the input source is the video line input, processing transfers to a step 113 and, if the input source is the analog TV tuner input, processing transfers to a step 115. After recording restriction by the macrovision of the input video, the copying controlling processing by the CGMS of the input video is executed as explained with reference to FIG. 16 (step 114).

If, in the step 115, the WM of the input video is to be analyzed, processing transfers to a step 116, so that the copying controlling processing by WM is carried out as explained in FIGS. 16 and 17. On the other hand, the is_WM_checked is set to 1. If conversely the recording is to be made without analyzing the WM of the input video, processing transfers to a step 117 to set the is_WM_cheked to 0.

After these processing operations, the input video is MPEG encoded into a transport stream (step 118). The processing of steps 119, 120 and 121 is carried out as in the case of the aforementioned case where the input source is the TS.

In this manner, the information of the source_security_info of the AV stream for recording is formulated and recorded along with the AV stream.

The reproducing apparatus for performing reproduction restrictions is now explained.

Figure 24:
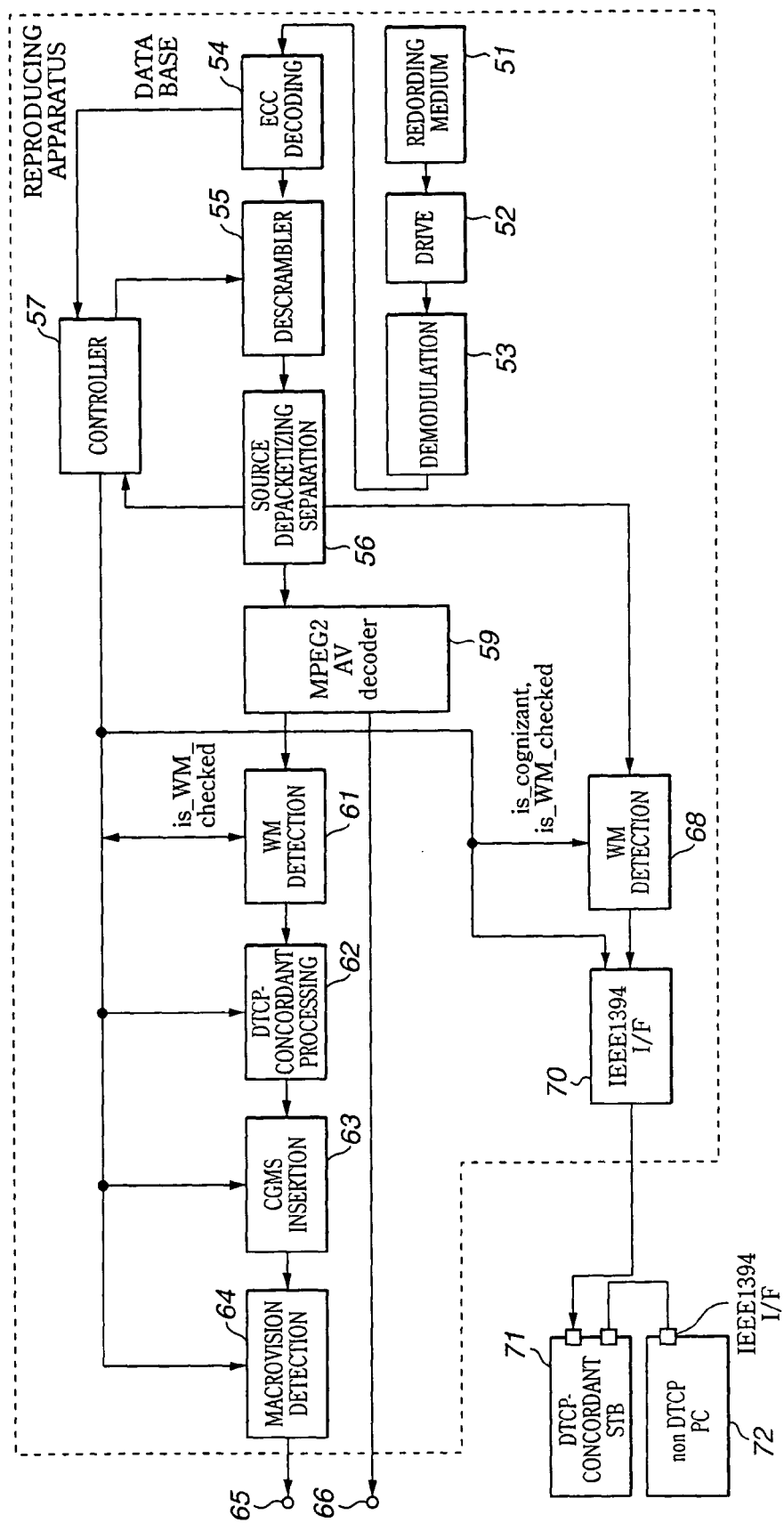
FIG. 24 is a block diagram showing a reproducing apparatus embodying the present invention.

FIG. 24 is a block diagram showing a reproducing apparatus embodying the present invention. In reproducing an AV stream, reproduction restrictions are imposed based on the source_security_info thereof.

This reproducing apparatus includes a drive 52 for reading-in a recording medium 51, having recorded thereon an AV stream file and the application database information, a demodulating unit 53 for performing demodulation processing, an ECC (error correction) decoding unit 54, a descrambler 55 for performing descrambling processing, a source packetizing/separating unit 56, and a controller 57 for performing E_CCI inspection and reproduction restricting processing. The reproducing apparatus also includes an MPEG2AV decoder 59 for decoding an input stream and outputting the video and the audio, a WM inspection unit 61 for performing the processing for inspecting the WM and the processing of reproduction restriction, a DTCP-concordant processor 62 for performing processing for performing reproduction restriction concordant with the DTCP, a CGMS inserting unit 63 for performing CGMS processing, a macrovision inserting unit 64 for performing macrovision processing, a terminal 65 for outputting reproduction video signals and a terminal 66 for outputting audio signals. The reproducing apparatus further includes a WM inspection unit 68 for inspecting the WM and for performing the processing of reproduction restrictions, and an IEEE1394 interface (I/F) 70 for performing DTCP-concordant processing. The transport processing from this reproducing apparatus is output to a DTCP-concordant STB 71 and to a DTCP-non-concordant external PC 72.

First, the application database information, including the source_security_info, is read out from the recording medium 51. The database information is processed by the demodulating unit 53 and the ECC (error correction) decoding unit 54 so as to be input to the controller 57. In this controller 57, the list of the PlayList, recorded on a disc (recording medium 51), is output to a user interface, not shown. The user selects the PlayList, desired to be reproduced, from the list of PlayList, so that the PlayList, specified to be reproduced, is commanded to the controller 57. In the controller 57, the AV stream file, necessary for reproducing the PlayList, is read out from the recording medium 51. In the driver 52, the AV stream is read out from the recording medium 51. The AV stream, thus read out, is processed by the demodulating unit 53 and the ECC decoding unit 54 and thence supplied to the descrambler 55. In this descrambler 55, the descrambling operation, which is based on the corresponding database information, is carried out, and a source packet string is sent to the source depacketizing/separating unit 56.

The ensuing processing differs depending on whether the ultimate replay output is the video output or the TS output.

First, the processing downstream of the source packetizing/separating unit 56 in case the reproduction output is the video output is explained.

From the source packetizing/separating unit 56, the copy_permission_indicator (c_p_i) of the header of the input source packet is sent to the controller 57. From the source packetizing/separating unit 56, the E_CCI (Embedded CCI) encoded into the AV stream composed of the source packet string is sent to the controller 57. In this controller 57, the processing of inspecting this E_CCI and of applying restrictions on reproduction is carried out, as will be explained later on.

FIG. 25 shows the processing of the reproducing apparatus inspecting the E_CCI at the time of reproduction for imposing restrictions on reproduction. If the is_cognizant of the source_security_info is '0', analysis of E_CCI (Embedded CCI) is not carried out at the time of recording the corresponding AV stream, so that the processing of inspecting the E_CCI and applying restrictions on the reproduction is carried out at the time of reproduction. That is, if E_CCI is '00', the video may be reproduced. If the E_CCI is '10', the video may be reproduced, however, the CCI is updated to '01'. If the E_CCI is '11' or '01', it indicates unauthorized recording, and hence the video reproduction is discontinued.

The source packetizing/separating unit 56 separates the MPEG video stream and the audio stream from the source packet string. The so separated streams are supplied to the MPEG2AV decoder 59. From the MPEG2AV decoder 59, the input stream is decoded and both video and audio are output.

The video signals from the MPEG2AV decoder 59 are input to the WM inspection unit 61 to perform the processing of WM inspection and reproduction restriction.

FIG. 26 illustrates the processing executed by the WM inspection unit 61. If the is_cognizant of the source_security_info is '0', WM analysis is not performed when recording the corresponding AV stream, so that processing of WM inspection and reproduction restriction is carried out at the time of reproduction. That is, if the WM is '00', the AV stream may be reproduced. If the WM is '10', the video may be reproduced, however, the WM is updated to '01'. If the WM is '101' or '11', it indicates unauthorized recording, and hence the video reproduction is discontinued. Meanwhile, if the watermark has not been introduced in for example the analog TV broadcast, and the source_type of the source_security_info indicates a tuner input of the analog TV, no processing needs to be performed in the WM inspection unit 61.

The video signals from the WM inspection unit 61 are input to the DTCP-concordant processor 62. If the source_type of the source_security_info indicates a DTCP-concordant source, the DTCP-concordant processor 62 performs the processing of the DTCP-concordant reproduction restriction. For example, if the source_type is the DTCP-concordant source, and the CCI of the DTCP descriptor in the transport stream is '01' (no more copy), outputting with the resolution of HDTV (high definition television) is not allowed, as long as analog video reproduction is concerned, if the provisions of the DTLA are followed. Thus, if the HDTV video is input in this case, the DTCP-concordant processor 62 performs the processing of downsampling the video to the resolution of SDTV (standard definition television) and outputting the resulting video.

The video signals of this DTCP-concordant processor 62 are input to the CGMS inserting unit 63 to undergo CGMS processing. The video signals from this CGMS inserting unit 63 are input to the macrovision inserting unit 64 to undergo macrovision processing. Subsequently, the replay video signals are output from the macrovision inserting unit 64.

The processing downstream of the source packetizing/separating unit 56, in case the replay output is the TS output, is hereinafter explained.

From the source packetizing/separating unit 56, the copy_permission_indicator (c_p_i) of the input source packet is supplied to the controller 57. If the information of the source_security_info is encoded in the AV stream composed of the source packet string, the information is decoded in the source packetizing/separating unit 56 and sent to the controller 57. From the source packetizing/separating unit 56, the E_CCI (Embedded CCI), encoded in the AV stream composed of the source packet string, is supplied to the controller 57. Moreover, in the source packetizing/separating unit 56, the transport stream is separated from the source packet string and sent to the WM inspection unit 68.

The transport stream from the source packetizing/separating unit 56 is input to the WM inspection unit 68 to undergo the processing of WM inspection and reproduction restrictions. The processing executed in the WM inspection unit 68 is similar to that explained above with reference to FIG. 26. The transport stream from this WM inspection unit 68 is input to the IEEE1394 interface 70.

If the source_type of the source_security_info indicates the DTCP-concordant source, the transport stream must be output in accordance with the DTCP-concordant method. If the transport stream is output to the STB 71 by the DTCP-concordant method, preset DTCP-concordant processing is carried out in the IEEE1394 interface 70. If the source_type of the source_security_info ( ) indicates the non-DTCP-concordant source, it is also possible to output the transport stream to the non-DTCP-concordant external PC 72.

Figure 27:
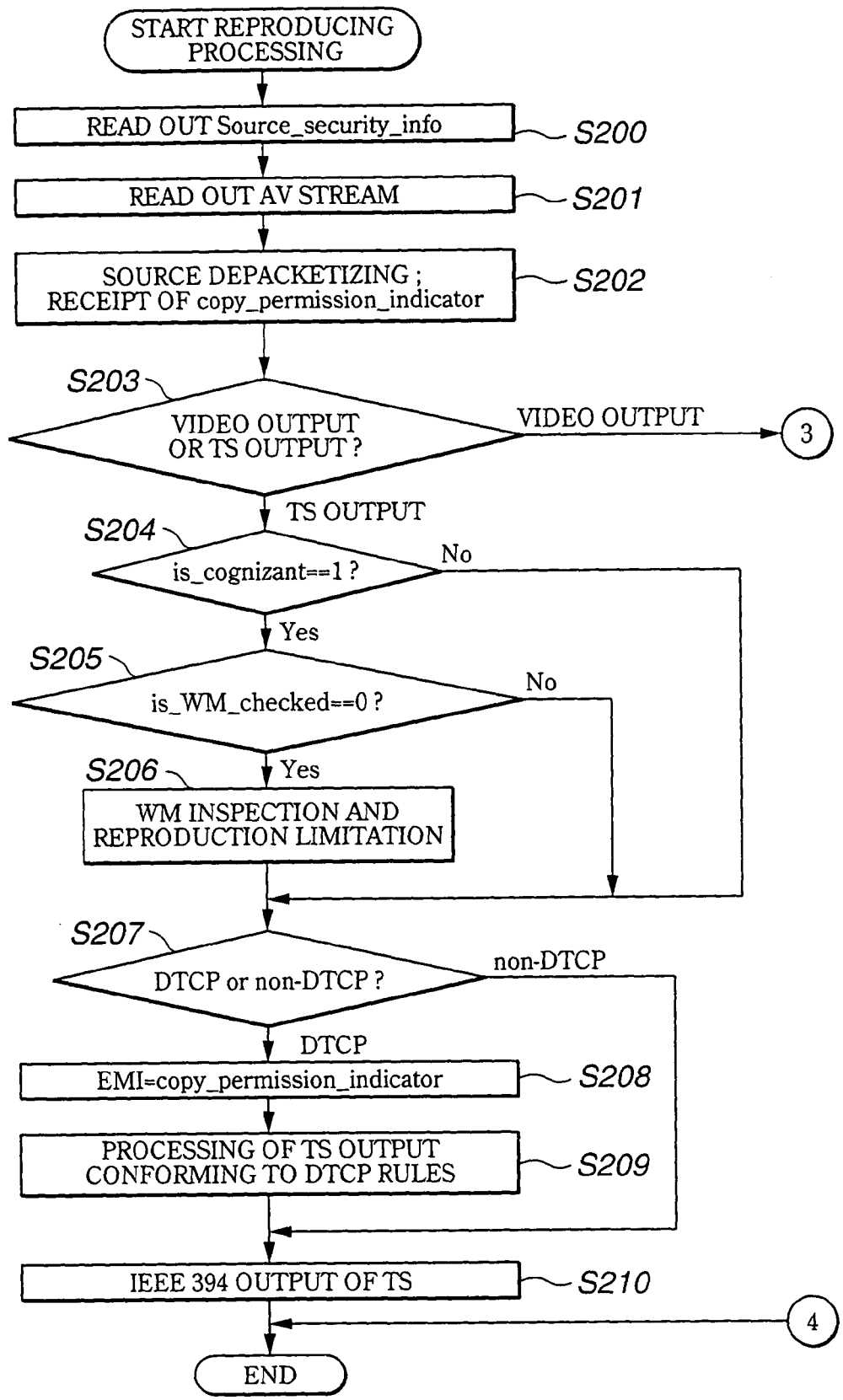
FIG. 27 is a flowchart illustrating the reproduction restriction based on source_security_info ( ) in reproducing an AV stream.
Figure 27:
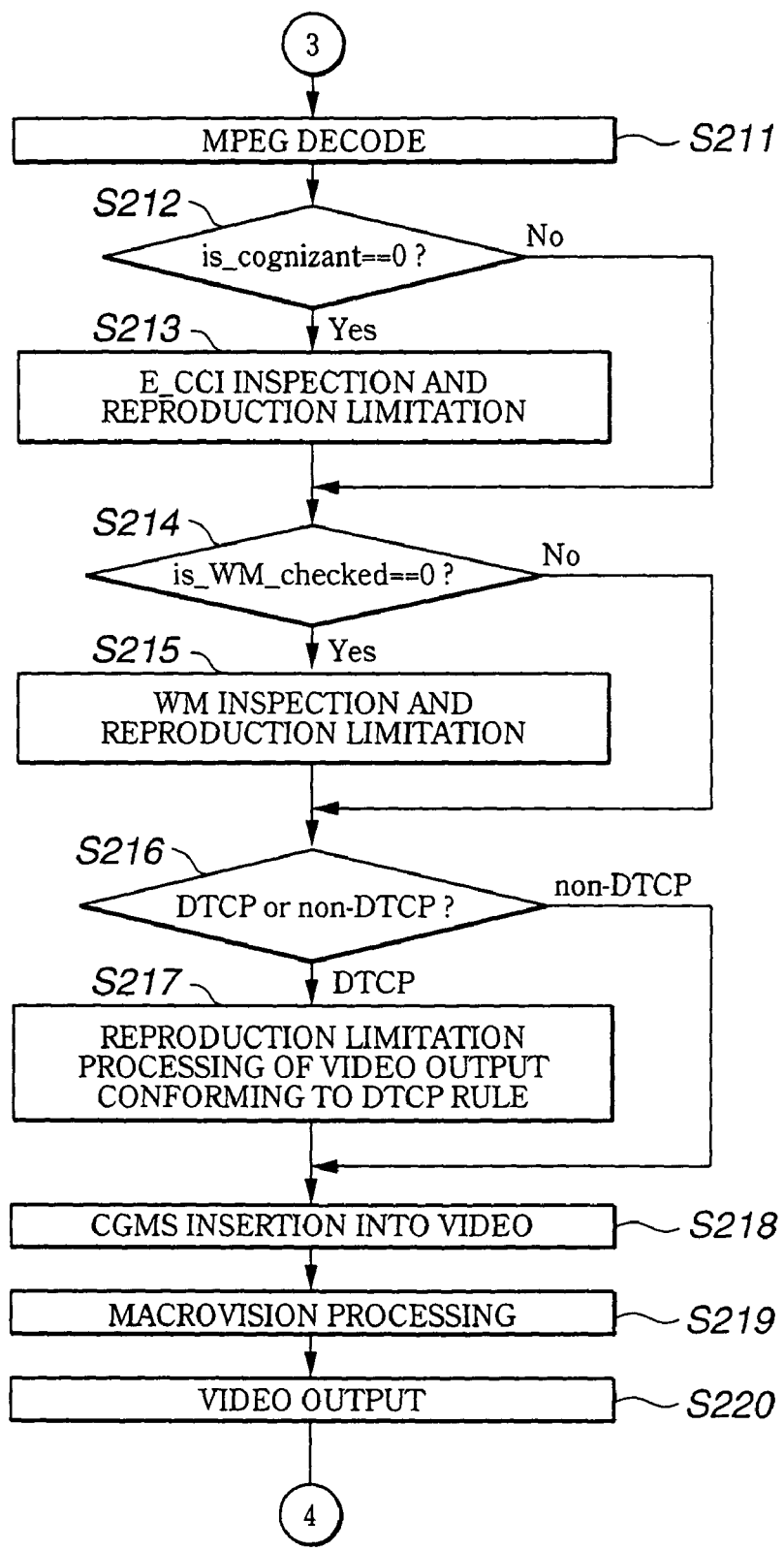

FIG. 27 is a flowchart showing the processing for performing the processing of reproduction restrictions based on the source_security_info ( ) of the AV stream when reproducing the AV stream. In the reproduction processing, the source_security_info is read out (step 200) and an AV stream file corresponding to the source_security_info is read out (step 201). The transport stream is separated from the source packet string of this AV stream file. The copy_permission_indicator in the source packet header is received (step 202).

Meanwhile, if the source_security_info has been encoded in the AV stream, the source_security_info is read out in this step.

It is then checked whether the video output is to be reproduced or the TS output is to be reproduced (step 203). If it is the video output that is reproduced, processing transfers to a step 211. If it is the TS output that is reproduced, processing transfers to a step 204.

First, the case of reproducing the TS output is explained. If the TS output is to be reproduced, and the is_cognizant is 1 in the step 204, processing transfers to a step 205. If the is_cognizant is 0, processing transfers to a step 207. In the step 205, if the is_WM_checked is 0, processing transfers to a step 206, whereas, if the is_WM_checked is 1, processing transfers to a step 207. In this step 206, WM inspection and reproduction restrictions are carried out, as explained with reference to FIG. 26.

If, in the step 207, the source_type of the source_security_info indicates the DTCP-concordant input source, processing transfers to a step 208 and, if otherwise, to step 210. If the DTCP-concordant input source is indicated, the value of the TS output concordant with the DTCP rule, such as scrambling processing, is carried out (step 209). The TS is aisochronously transmitted to the IEEE1394 (step 210) to terminate the processing.

The case of video output reproduction in the step 203 is now explained. If the video output is reproduced, the transport stream is first decoded to take out video and audio signals (step 211). If subsequently the is_cognizant is 0 in a step 212, processing transfers to a step 213. If the is_cognizant is 1, processing transfers to a step 214. In the step 213, E_CCI inspection and reproduction restrictions are carried out, as explained with reference to FIG. 25.

If, in the step 214, the is_WM_checked is 0, processing transfers to a step 215. If the is_WM_checked is 1, processing transfers to a step 216. In the step 215, WM inspection and reproduction restrictions are carried out, as explained with reference to FIG. 26.

If, in the step 216, the source_type of the source_security_info indicates the DTCP-concordant input source, processing transfers to a step 217 and, if otherwise, to a step 218. In this step 217, the processing of applying restrictions on reproduction of the video output in accordance with the DTCP rule, such as processing of restricting the number of lines to 500 or less, is carried out. Here, the aforementioned processing is carried out in the DTCP-concordant processor 62 in the reproducing apparatus of FIG. 24.

The processing of inserting CGMS into the video then is carried out (step 218). If the CCI is updated in the step 213, or the WM is updated in the step 215, the CGMS is set to indicate the updated latest CCI. If the CCI and the WM are different in states from each other, the application determines which is to be preferred. Later on, the macrovision is inserted by a predetermined method into the video signals (step 219). For example, the macrovision is inserted into the video signal in accordance with the macrovision command signal encoded in the APS of the DTCP_descriptor in the AV stream file. The video output is made (step 220) to complete the processing. The recorded AV stream is appropriately reproduced based on the source_security_info.

Thus, in the present embodiment, appropriate reproduction restrictions may be imposed at the time of reproducing an AV stream, by recording, along with the AV stream, the source_security_info ( ) having at least one of the sort of the input source, the information as to whether the recording is by cognizant recording or by non-cognizant recording, and the information indicating whether or not the recording has been made as the watermark has been analyzed at the time of recording.

For example, in recording a transport stream, such as the transport stream of the digital TV broadcast, there are two recording methods, that is a method in which the transport stream from the digital TV tuner enclosed in the recording apparatus is to be an input source, and a method in which the transport stream input through the IEEE1394 from the external set top box is to be an input source. With the former method, the DTCP method need not be used, such that, when the stream recorded by the former method is reproduced, there is no necessity of performing reproduction restrictions concordant with the DTCP system.

With the latter method, recording must be made using the method concordant with the DTCP method, at least as long as the BS digital broadcast of Japan is concerned. Thus, if the stream recorded with the latter method is reproduced, reproduction restrictions must be imposed in accordance with the DTCP system. In such case, appropriate reproduction restrictions may be imposed by referencing the source_type of the source_security_info.

It is currently attempted to introduce the watermark into the DVD video for preventing the analog video output from the DVD video player from being recorded illicitly. On the other hand, it is likely that the watermark is not introduced into the analog TV broadcast in which recording may be made basically freely. In such case, the input source of the MPEG stream, recorded on self-encoding the analog video line input, is highly likely to be a DVD video output, so that, in reproducing the MPEG stream, it is required to check the watermark to impose replay restrictions. On the other hand, with the MPEG stream in which the analog TV broadcast is self-encoded and recorded, it may be premeditated that the watermark need not be checked in reproducing the MPEG stream. In such case, appropriate reproduction restrictions may be imposed by referencing the source_type of the source_security_info.

Additionally, the cognizant recording mode and the non-cognizant recording mode may be used in recording a transport stream in accordance with the DTCP-concordant system. If the transport stream recorded with the cognizant recording mode is decoded to reproduce the analog video, it is unnecessary to check the Embedded CCI or the watermark in the transport stream. If, on the other hand, the transport stream recorded with the non-cognizant recording mode is decoded to reproduce the analog video, it is necessary to check the Embedded CCI or the watermark in the transport stream. In this case, appropriate reproduction restrictions may be imposed by referencing the source_type, is_cognizant and the is_WM_checked of the source_security_info.

Moreover, if the AV stream has been recorded as the watermark is checked during the recording, it is unnecessary to check the watermark in reproducing the AV stream. If conversely the AV stream has been recorded as the watermark is not checked during the recording, it is necessary to check the watermark in reproducing the AV stream. In such case, appropriate reproduction restrictions can be imposed by referencing the is_WM_checked of the source_security_info.

Since recording is made as the Integrity_Check_Value is appended to the source_security_info or as the source_security_info is scrambled, secure management may be achieved in such a manner that the information of the source_security_info is not falsified.

Moreover, by recording the status_WM in the source_security_info, it is unnecessary to analyze the AV stream in case it is desired to comprehend the status indicated by the watermark in reproducing the AV stream. Thus, if it is desired to copy to a recording medium on which recording has been made on the AV stream basis, it can be checked whether or not copying can be made by referencing the status_WM without analyzing the watermark embedded in the AV stream. Additionally, the WM_transition_flag can be used for expediting the processing in carrying out the processing of retrieving WM transition points in the AV stream.

In the present embodiment, reference is made to the rule concordant with the DTCP (Digital Transmission Content Protection), termed 5C, as the rule pertinent to the protective function of digital contents. However, the present invention may be applied to other rules pertinent to the digital content protective functions.

The respective processing explained in the above-described embodiment may be furnished as a program executed by a computer such as an information recording apparatus or on an information reproducing apparatus. This program may not only be furnished as a recording medium, such as CD-ROM for readout by readout means such as CD-ROM drives, or may be furnished from a remote program transmitting apparatus over a network so as to be installed on the computer. Moreover, although the DVR is taken as an example of a recording medium, it may, of course, be other recording mediums, such as recording mediums having similar data formats.

INDUSTRIAL APPLICABILITY

According to the present invention, described above, the information including an input source in a stream recorded on a recording medium can be supervised appropriately.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An information recording apparatus comprising:
an input unit for inputting a data stream received from a preset input source, the data stream including at least a video stream; and
a recording unit for recording the data stream in one or more stream files on a recording medium and for recording ancillary data on the recording medium in one or more further files that are respectively associated with the one or more stream files, the ancillary data including source type information indicating the source type of the preset input source and including status information, the source type information being indicative of whether output of the video stream after being decoded is permitted at a high definition television (HDTV) resolution or is only permitted at a standard definition television resolution and being indicative of whether or not the data stream is derived from an input source concordant with a rule pertinent to a content protecting function usable for applying restrictions on the reproduction of the data stream, the ancillary data including further information indicative of whether an analog copy protection signal is to be inserted into the video stream when the decoded video stream is output as an analog video stream, the status information indicating a same copying status as indicated by a digital watermark embedded within the one or more stream files thereby enabling the copying status of the one or more stream files to be determined without requiring analysis of the one or more stream files.

2. The information recording apparatus according to claim 1, wherein said recording unit records, within the ancillary data in the given further file, information indicating whether the recording mode for the data stream is the cognizant recording mode or the non-cognizant recording mode.

3. The information recording apparatus according to claim 1, wherein said recording unit adds, within the ancillary data in the given further file, a code for preventing falsification of the ancillary data or encrypts and records the ancillary data.

4. The information recording apparatus according to claim 1, wherein said recording unit records, within the ancillary data in the given further file, information for indicating whether or not the preset input source is DTCP (Digital Transmission Content Protection) concordant.

5. An information reproducing apparatus for reproducing a data stream from a recording medium, the data stream including at least a video stream, the apparatus comprising:
an information readout unit for reading out the data stream from one or more stream files that are recorded on the recording medium, and for reading out ancillary data from one or more further files that are recorded on the recording medium and which are respectively associated with the one or more stream files, the ancillary data including source type information indicating the source type of an input source that provided the data stream and including status information, the ancillary data including further information indicative of whether an analog copy protection signal is to be inserted into the video stream when the decoded video stream is output as an analog video stream; and
a controller for applying predetermined reproduction restrictions to the reproduction of the data stream based on the ancillary data read out by said information readout unit including verifying, from the source type information included in the ancillary data read out by said information readout unit, whether output of the video stream after being decoded is permitted at a high definition television (HDTV) resolution or is only permitted at a standard definition television resolution and whether or not the data stream is derived from an input source concordant with a rule pertinent to a content protecting function and, if the data stream is derived from such an input source, said controller causes reproduction restrictions to be applied in accordance with that rule while reproducing the resulting stream,
wherein the status information indicates a same copying status as indicated by a digital watermark embedded within the one or more stream files, the controller thereby determining the copying status of the one or more stream files determined without requiring analysis of the one or more stream files.

6. The information reproducing apparatus according to claim 5, wherein the ancillary data includes watermark check information, and said controller determines from the read out watermark check information that the watermark was checked at the time of recording of the data stream and then reproduces the read out data stream using the status information information included in the ancillary data.

7. The information reproducing apparatus according to claim 5, wherein the ancillary data in the given further file read out by said information readout unit includes information indicating whether a stream recording mode in said recording medium is a cognizant recording mode or a non-cognizant recording mode, and said controller causes the data stream to be decoded to reproduce analog video based on the read-out information indicating whether the stream recording mode in said recording medium is the cognizant recording mode or the non-cognizant recording mode.

8. A recording and/or reproducing apparatus, comprising:
an input unit for inputting a data stream received from an input source concordant with a rule pertinent to a protecting function for digital content contained within the data stream, the data stream including at least a video stream;
a recording unit for recording the data stream, inputted by said input unit, in one or more stream files on a recording medium and for recording ancillary data on the recording medium in one or more further files that are respectively associated with the one or more stream files, the ancillary data including source type information indicating the source type of the input source and including status information, the source type information being indicative of whether output of the video stream after being decoded is permitted at a high definition television (HDTV) resolution or is only permitted at a standard definition television resolution and indicative that the recorded data stream is derived from an input source concordant with the protecting function, the ancillary data including further information indicative of whether an analog copy protection signal is to be inserted into the video stream when the decoded video stream is output as an analog video stream;
an information readout unit for reading out the data stream from the one or more stream files that are recorded on the recording medium and for reading out the ancillary data from the one or more further files that are recorded on the recording medium;
a controller for applying predetermined reproduction restrictions to the reproduction of the data stream based on the ancillary data read out by said information readout unit including verifying, from the source type information included in the ancillary data read out by said information readout unit, whether output of the video stream after being decoded is permitted at a high definition television (HDTV) resolution or is only permitted at a standard definition television resolution and that the data stream is derived from an input source concordant with the rule pertinent to the content protecting function, and causing reproduction restrictions to be applied in accordance with that rule while reproducing the resulting stream,
wherein the status information indicates a same copying status as indicated by a digital watermark embedded within the one or more stream files, the controller thereby determining the copying status of the one or more stream files determined without requiring analysis of the one or more stream files; and
an output unit for issuing video output from the reproduced data stream in accordance with the reproduction restrictions conforming to the rule pertinent to the content protecting function.

9. The recording and/or reproducing apparatus according to claim 8, wherein the ancillary data recorded on the recording medium further indicates whether or not the data stream has been inputted using a method concordant with DTCP (Digital Transmission Content Protection).

10. A data stream recording method, the method comprising:
using a computer to carry out the following:
determining a source type of an input source of an input data stream,
recording the data stream in one or more stream files on a recording medium, the data stream including at least a video stream, and
recording ancillary data on the recording medium in one or more further files that are respectively associated with the one or more stream files, the ancillary data including source type information indicating the source type of the preset input source and including status information, the source type information being indicative of whether output of the video stream after being decoded is permitted at a high definition television (HDTV) resolution or is only permitted at a standard definition television resolution and being indicative of whether or not the data stream recorded in the associated stream file is derived from an input source concordant with a rule pertinent to a content protecting function usable for applying restrictions on the reproduction of the data stream, the ancillary data including further information indicative of whether an analog copy protection signal is to be inserted into the video stream when the decoded video stream is output as an analog video stream, the status information indicating a same copying status as indicated by a digital watermark embedded within the one or more stream files thereby enabling the copying status of the one or more stream files to be determined without requiring analysis of the one or more stream files.

11. A data stream reproducing method, the method comprising:
using a computer to carry out the following:
reading out the data stream from one or more stream files that are recorded on a recording medium, the data stream including at least a video stream,
reading out ancillary data from one or more further files that are recorded on the recording medium and which are respectively associated with the one or more stream files, the ancillary data and including source type information indicating a source type of an input source that provided the data stream and including status information, the source type information being indicative of whether output of the video stream after being decoded is permitted at a high definition television (HDTV) resolution or is only permitted at a standard definition television resolution and being indicative of whether or not the data stream is derived from an input source concordant with a rule pertinent to a content protecting function usable for applying restrictions on the reproduction of the data stream, the ancillary data including further information indicative of whether an analog copy protection signal is to be inserted into the video stream when the decoded video stream is output as an analog video stream, and
applying predetermined reproduction restrictions to the reproduction of the data stream based on the read out ancillary data including:
verifying, from the source type information included in the ancillary data, whether output of the video stream after being decoded is permitted at a high definition television (HDTV) resolution or is only permitted at a standard definition television resolution and whether or not the data stream is derived from an input source concordant with a rule pertinent to a content protecting function, and
if the data stream is derived from such an input source, causing reproduction restrictions to be applied in accordance with that rule while reproducing said the data stream, wherein the status information indicates a same copying status as indicated by a digital watermark embedded within the one or more stream files, the verifying step thereby determining the copying status of the one or more stream files without requiring analysis of the one or more stream files.

12. The stream reproducing method according to claim 11, wherein said verifying step verifies from the source type information that the data stream is derived from a DTCP (Digital Transmission Content Protection) concordant input source, said causing step causes DTCP-concordant reproduction restrictions to be applied while reproducing the data stream.

13. A non-transitory computer-readable recording medium having stored therein a computer program having instructions for executing a data stream recording method, the method comprising:
 determining a source type of an input source of an input data stream;
 recording the data stream in one or more stream files on a recording medium, the data stream including at least a video stream; and
 recording ancillary data on the recording medium in one or more further files that are respectively associated with the one or more stream files, the ancillary data including source type information indicating the source type of the preset input source and including status information, the source type information being indicative of whether output of the video stream after being decoded is permitted at a high definition television (HDTV) resolution or is only permitted at a standard definition television resolution and being indicative of whether or not the data stream is derived from an input source concordant with a rule pertinent to a content protecting function usable for applying restrictions on the reproduction of the data stream, the ancillary data including further information indicative of whether an analog copy protection signal is to be inserted into the video stream when the decoded video stream is output as an analog video stream, the status information indicating a same copying status as indicated by a digital watermark embedded within the one or more stream files thereby enabling the copying status of the one or more stream files to be determined without requiring analysis of the one or more stream files.

14. The recording medium according to claim 13, wherein said method includes recording, within the ancillary data in the given further file on said recording medium, information indicating whether the recording mode of the data stream is the cognizant recording mode or the non-cognizant recording mode.

15. A non-transitory computer-readable recording medium having stored therein a computer program having instructions for executing a stream reproducing method, the method comprising:
 reading out the data stream from one or more stream files that are recorded on a recording medium, the data stream including at least a video stream;
 reading out ancillary data from one or more further files that are recorded on the recording medium and which are respectively associated with the one or more stream files, the ancillary data and including source type information indicating a source type of an input source that provided the data stream and including status information, the source type information being indicative of whether output of the video stream after being decoded is permitted at a high definition television (HDTV) resolution or is only permitted at a standard definition television resolution and being indicative of whether or not the data stream is derived from an input source concordant with a rule pertinent to a content protecting function usable for applying restrictions on the reproduction of the data stream, the ancillary data including further information indicative of whether an analog copy protection signal is to be inserted into the video stream when the decoded video stream is output as an analog video stream; and
 applying predetermined reproduction restrictions to the reproduction of the data stream based on the read out ancillary data including:
  verifying, from the source type information included in the ancillary data, whether output of the video stream after being decoded is permitted at a high definition television (HDTV) resolution or is only permitted at a standard definition television resolution and whether or not the data stream is derived from an input source concordant with a rule pertinent to a content protecting function, and
  if the data stream is derived from such an input source, causing reproduction restrictions to be applied in accordance with that rule while reproducing said the data stream;
  wherein the status information indicates a same copying status as indicated by a digital watermark embedded within the one or more stream files, the verifying step thereby determining the copying status of the one or more stream files without requiring analysis of the one or more stream files.

16. A non-transitory computer-readable recording medium configured for being read into and being reproduced from by an information processing apparatus, and comprising:
 an information recording area including one or more stream files in which a data stream is recorded and one or more further files in which ancillary data is recorded, the data stream including at least a video stream, the one or more further files being respectively associated with the one or more stream files;
 the ancillary data including source type information indicating the source type of the preset input source and including status information, the source type information being indicative of whether output of the video stream after being decoded is permitted at a high definition television (HDTV) resolution or is only permitted at a standard definition television resolution and being indicative of whether or not the recorded data stream is derived from an input source concordant with a rule pertinent to a content protecting function usable for applying restrictions on the reproduction of the data stream, the ancillary data including further information indicative of whether an analog copy protection signal is to be inserted into the video stream when the decoded video stream is output as an analog video stream, the status information indicating a same copying status as indicated by a digital watermark embedded within the one or more stream files thereby enabling the copying status of the one or more stream files to be determined without requiring analysis of the one or more stream files.

17. The recording medium according to claim 16, wherein the ancillary data includes information indicating whether the recording mode of the data stream is the cognizant recording mode or the non-cognizant recording mode.

* * * * *